US008425042B2

(12) United States Patent  
Hruska et al.

(10) Patent No.: US 8,425,042 B2  
(45) Date of Patent: Apr. 23, 2013

(54) MULTI-SEGMENT OPTICAL RETARDER FOR CREATING 3D IMAGES

(75) Inventors: Curtis R. Hruska, Windsor, CA (US); David M. Shemo, Windsor, CA (US); Kim Leong Tan, Singapore (SG)

(73) Assignee: JDS Uniphase Corporation, Milpitas, CA (US)

( * ) Notice: Subject to any disclaimer, the term of this patent is extended or adjusted under 35 U.S.C. 154(b) by 265 days.

(21) Appl. No.: 12/851,969

(22) Filed: Aug. 6, 2010

(65) Prior Publication Data

US 2011/0032483 A1  Feb. 10, 2011

Related U.S. Application Data

(60) Provisional application No. 61/232,150, filed on Aug. 7, 2009.

(51) Int. Cl.
*G03B 21/00* (2006.01)

(52) U.S. Cl.
USPC .......... 353/7; 353/8; 353/20; 353/31; 353/84; 353/98; 349/7; 359/485.01

(58) Field of Classification Search .................. 353/7, 8, 353/20, 30, 31, 33, 34, 37, 38, 84, 98, 99, 353/122; 349/5, 7, 9, 15, 18, 95, 96–103, 349/112; 359/485.01, 485.03, 485.05, 485.06, 359/485.07, 636, 489.07
See application file for complete search history.

(56) References Cited

U.S. PATENT DOCUMENTS

| 4,792,850 A | 12/1988 | Liptoh et al. ..................... 348/57 |
| 5,402,191 A | 3/1995 | Dean et al. ....................... 352/63 |
| 5,921,650 A * | 7/1999 | Doany et al. ..................... 353/31 |
| 6,128,059 A | 10/2000 | Nishiguchi ..................... 349/129 |
| 6,222,672 B1 * | 4/2001 | Towler et al. ................. 359/465 |
| 6,252,707 B1 | 6/2001 | Kleinberger et al. ......... 359/465 |
| 6,676,259 B1 | 1/2004 | Trifilo ............................. 353/20 |
| 6,972,906 B2 | 12/2005 | Hasman et al. ............... 359/569 |
| 7,196,847 B2 * | 3/2007 | Ye ............................ 359/484.06 |
| 7,241,014 B2 * | 7/2007 | Lippey et al. ..................... 353/8 |

(Continued)

FOREIGN PATENT DOCUMENTS

| JP | 10 153755 | 6/1998 |
| JP | 2001174750 | 6/2001 |

(Continued)

OTHER PUBLICATIONS

Scott C. McEldowney et al, "Creating vortex retarders using photoaligned liquid crystal polymers" Optics letters, vol. 33, No. 2, p. 134, 2008.

(Continued)

*Primary Examiner* — Georgia Y Epps
*Assistant Examiner* — Sultan Chowdhury
(74) *Attorney, Agent, or Firm* — Matthew A. Pequignot; Pequignot + Myers

(57) ABSTRACT

A multi-segment optical retarder that can be used with or within a single projector for creating 3D images. The multi-segment optical retarder is coupled to an actuator used to effect some predetermined linear, rotary, or oscillating movement of the multi-segment optical retarder such that a fast axis orientation of each segment is substantially constant relative to itself over time and for a given area of incidence.

22 Claims, 16 Drawing Sheets

U.S. PATENT DOCUMENTS

| | | | |
|---|---|---|---|
| 7,404,642 B2* | 7/2008 | Shestak et al. | 353/7 |
| 7,414,786 B2 | 8/2008 | Brown et al. | 359/501 |
| 7,422,329 B2* | 9/2008 | Berman | 353/20 |
| 7,477,206 B2 | 1/2009 | Cowan et al. | 345/6 |
| 7,635,189 B2* | 12/2009 | DeCusatis et al. | 353/84 |
| 7,714,945 B2* | 5/2010 | Tan et al. | 349/8 |
| 8,004,761 B2* | 8/2011 | Chien et al. | 359/485.05 |
| 2002/0154404 A1* | 10/2002 | Sedlmayr | 359/487 |
| 2004/0008412 A1* | 1/2004 | Jiang et al. | 359/487 |
| 2004/0150889 A1* | 8/2004 | McDonald | 359/634 |
| 2005/0041163 A1 | 2/2005 | Butler-Smith et al. | 348/744 |
| 2005/0237487 A1 | 10/2005 | Chang | 353/7 |
| 2006/0017886 A1* | 1/2006 | Huber | 353/20 |
| 2006/0023143 A1 | 2/2006 | Lee | 349/102 |
| 2006/0038964 A1 | 2/2006 | Lu et al. | 353/84 |
| 2006/0290889 A1* | 12/2006 | Robinson et al. | 353/8 |
| 2007/0115551 A1 | 5/2007 | Spilman et al. | 359/494 |
| 2007/0139519 A1 | 6/2007 | DeCusatis et al. | 348/58 |
| 2007/0139616 A1 | 6/2007 | DeCusatis et al. | 353/7 |
| 2007/0139618 A1 | 6/2007 | DeCusatis et al. | 353/7 |
| 2007/0139624 A1 | 6/2007 | DeCusatis et al. | 353/84 |
| 2007/0183036 A1 | 8/2007 | Lipson et al. | 359/487 |
| 2008/0226844 A1 | 9/2008 | Shemo et al. | 428/1.1 |
| 2008/0239068 A1 | 10/2008 | Lipton | 348/60 |
| 2009/0122402 A1 | 5/2009 | Shemo et al. | 359/489 |
| 2010/0026935 A1 | 2/2010 | Bachels et al. | 349/75 |
| 2010/0079728 A1* | 4/2010 | Lee et al. | 353/8 |

FOREIGN PATENT DOCUMENTS

| | | |
|---|---|---|
| WO | 01/06282 | 1/2001 |
| WO | 02/076107 | 9/2002 |
| WO | 2008/056929 | 5/2008 |

OTHER PUBLICATIONS

Scott C. McEldowney, David M. Shemo, and Russell A. Chipman, "Vortex retarders produced from photo-aligned liquid crystal polymers", Optics Express, vol. 16, Issue 10, pp. 7295-7308, 2008.
EP appln 2282231 Search Report completed Mar. 29, 2011.

* cited by examiner

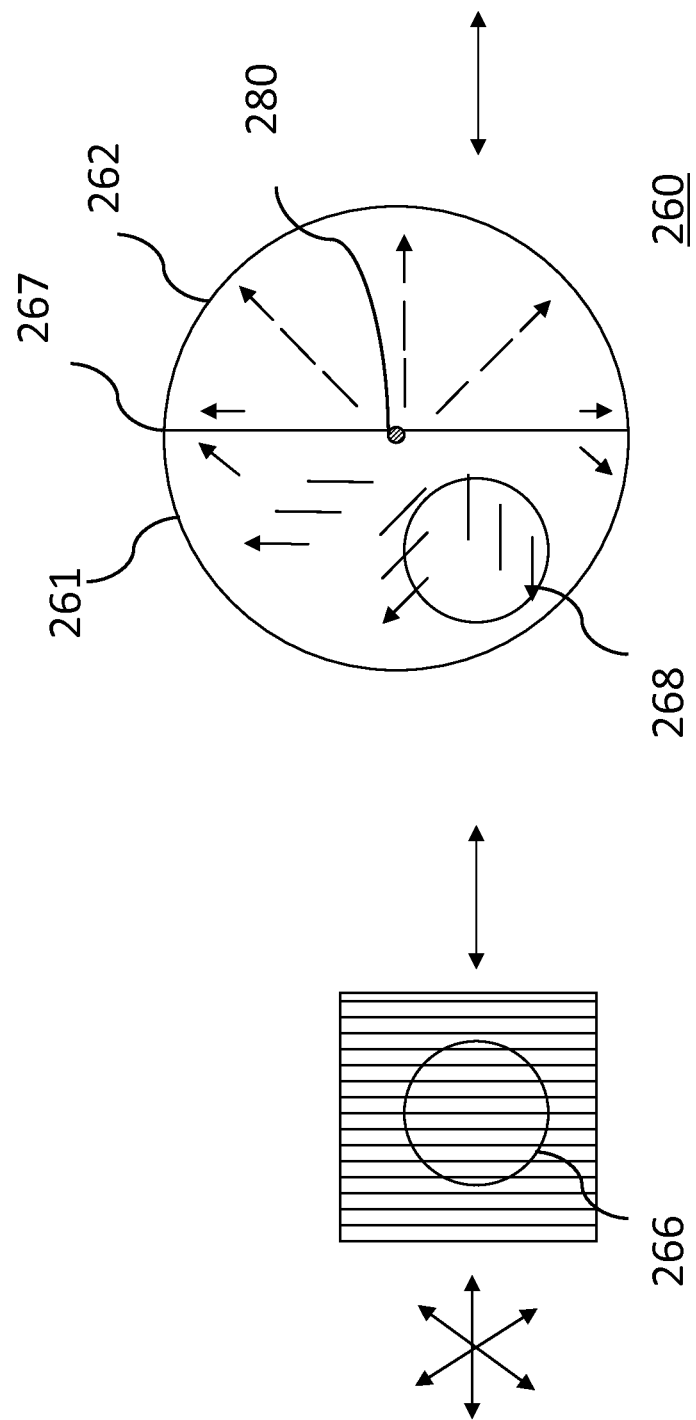

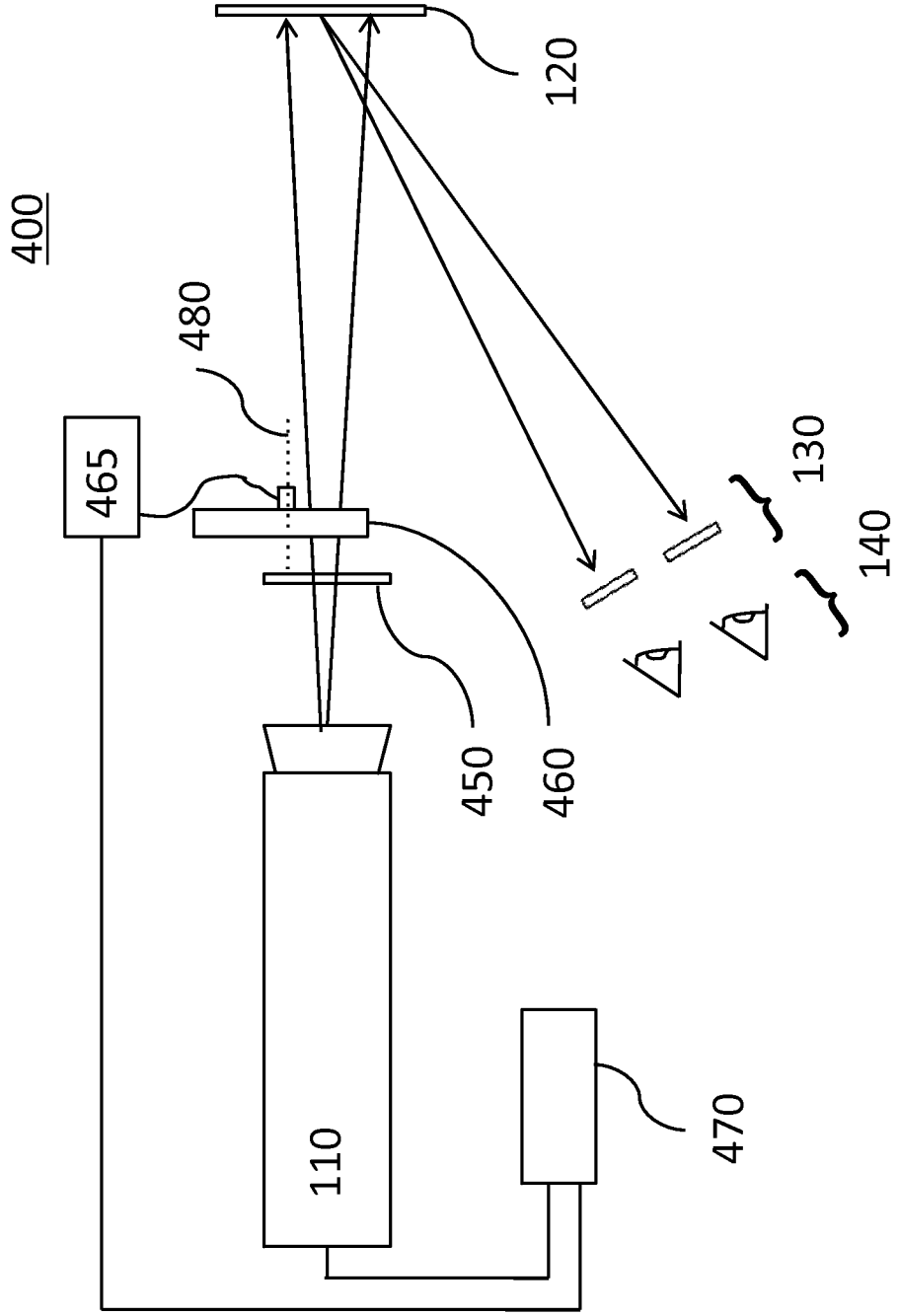

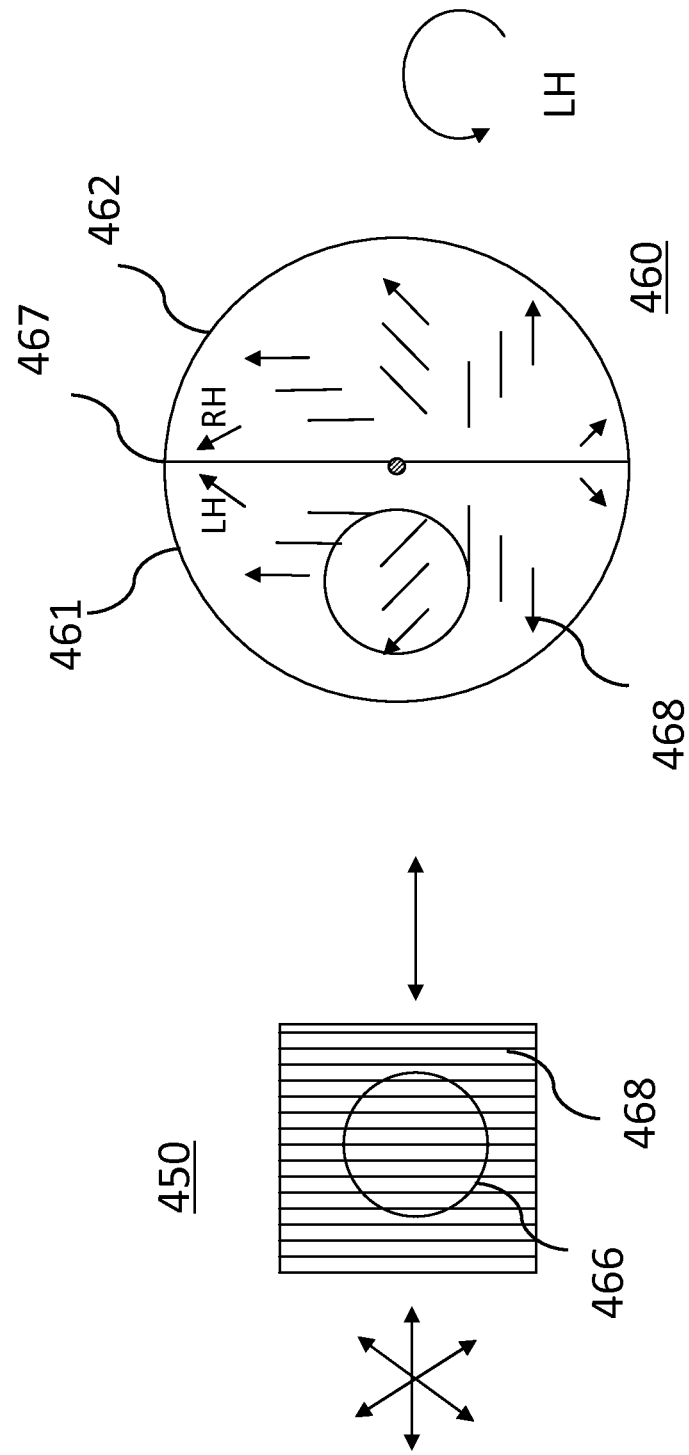

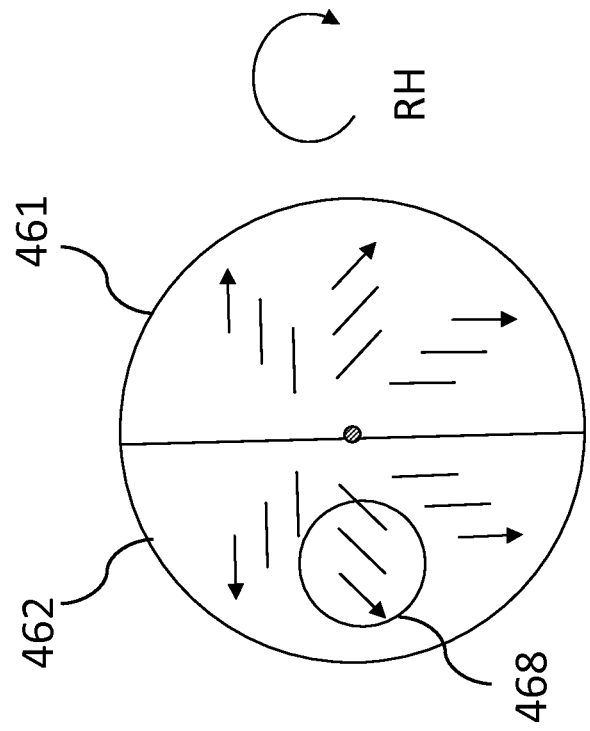
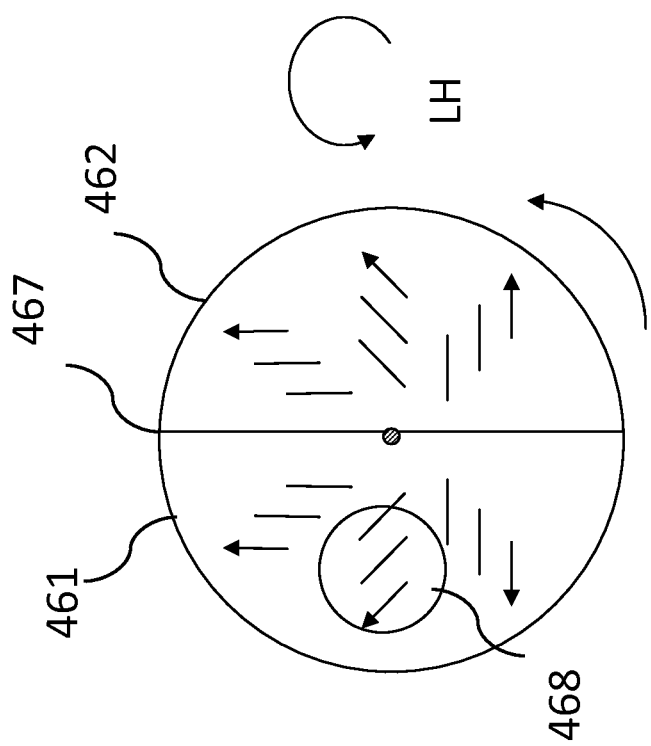
Fig. 4e
Fig. 4d

000000# MULTI-SEGMENT OPTICAL RETARDER FOR CREATING 3D IMAGES

CROSS-REFERENCE TO RELATED APPLICATIONS

This application claims priority from U.S. Provisional Application No. 61/232,150 filed Aug. 7, 2009, which is hereby incorporated by reference for all purposes.

MICROFICHE APPENDIX

Not Applicable.

TECHNICAL FIELD

The present application relates generally to multi-segment optical retarders, and in particular to multi-segment optical retarders for creating 3D images.

BACKGROUND OF THE INVENTION

Various techniques have been proposed to create realistic three-dimensional (3D) images, as perceived by a viewer. In general, most of these techniques involve using an image projector to project stereoscopic images onto a remote display screen. For example, original movie content originating from two cinema cameras separated by a small angle can be used to generate the stereo effect. When a viewer processes the images from each camera with a different eye, the viewer interprets these two related viewpoints as a 3D image of the corresponding scene. As is well known in the art, the 3D image corresponding to the two viewpoints can be recognized when the viewer views the image with 3D glasses.

In active 3D image technology, the glasses are typically powered and include moving or switchable elements. Unfortunately, these systems can be very expensive. In addition, since the glasses must be accurately synchronized with the projector that sends the images to the display, it can be challenging to achieve the necessary synchronization between the glasses and the signal source.

In passive 3D image technology, the viewer typically wears low-cost eyeglasses that do not have any active or powered components, but rather provide some optical effect that can discriminate between the two images projected on the screen. For example, anaglyph glasses, which include the well-known red-cyan glasses, can be used to discriminate images made up of two color layers, superimposed, but offset with respect to each other. Unfortunately, this technology has severe limitations, including poor color fidelity due to the use of tinted glasses. Accordingly, there has been continuing interest in polarization-based passive 3D image technology.

Traditionally, polarization-based 3D image technology has required two projectors, each of which is used to superimpose a different viewpoint on the display screen. More specifically, each projector includes or is coupled to a polarizer/retarder such that images corresponding to the two different viewpoints are projected with different polarization states. For example, in one embodiment each projector includes a linear polarizer such that the two viewpoints are projected with light having orthogonal polarization states. More commonly, each projector includes a circular polarizer so that the two viewpoints are projected with left and right-circularly polarized light (e.g., circular polarization technology has the advantage over linear polarization methods in that viewers are able to tilt their head and look about naturally without disturbing the 3D perception). In each case, the display screen is typically treated to retain the polarization state (e.g., is a polarization maintaining screen, which for example, is coated with silver or aluminum). The corresponding passive 3D glasses typically include two polarizing filters, each of which only allows light having a certain polarization therethrough (e.g., one lens is a circular polarizer allowing right-circularly polarized light to pass while the other lens is a circular polarizer allowing left-circularly polarized light to pass). Unfortunately, this projection system is also costly, as it typically requires two projectors. Moreover, if two projectors are used, they must be aligned very accurately such that the two images are correctly aligned on the display screen.

Another polarization-based 3D image technology that has recently gained more attention uses a single projector and includes a push-pull electro-optical liquid crystal modulator that is disposed in front of the projector lens. The left and right perspective fields of the push-pull modulator alternately produced left and right (or right and left) handed circularly polarized light at a sufficiently rapid rate to produce a generally flicker free stereoscopic effect for the viewer. For example, some examples of push-pull electro-optical liquid crystal modulators for use in projection systems are discussed in U.S. Pat. Nos. 4,792,850 and 7,477,206. While the cost of these systems is reduced due to the use of a single projector, the use of the push-pull modulator has been associated with inadequate image clarity, low dynamic range, slow transition time, poor transmission characteristics, and other performance issues, particularly when used in the theatrical environment.

In US Pat. Appl. No. 200502374487, a single projector is used in combination with a color wheel assembly to provide the stereoscopic imaging. The color wheel assembly includes a first portion able to polarize light in a first orientation and second portion able to polarize light in a second orientation. The color wheel is rotated through the different color and polarization orientations to provide the stereoscopic images. While the cost of this imaging system is also reduced relative to the dual projector system, the success of this system is expected to be limited by the rotation of the two polarizing portions of the color wheel. In particular, it is noted that as each polarizing portion is rotated about the common rotation axis, the uniform fast axis orientation of each polarizer will change with time for a particular illumination field. More specifically, light incident on a predetermined spot on the color wheel will be transmitted with a time varying polarization, including polarizations that are not one of the desired first and second orientations discussed above.

SUMMARY OF THE INVENTION

The instant invention relates to a multi-segment optical retarder that can be used with or within a single projector for creating 3D images. The multi-segment optical retarder is coupled to an actuator used to effect some predetermined linear, rotary, or oscillating movement of the multi-segment optical retarder such that a fast axis orientation of each segment is substantially constant relative to itself over time and for a given area of incidence. For example, in one embodiment, the multi-segment optical retarder is a mechanically rotated segmented quarterwave plate vortex retarder, which is used in conjunction with a stationary linear polarizer, or with a stationary azimuthally varying polarizer.

Advantageously, the multi-segment optical retarder of the instant invention provides a cost effective method of generating 3D images for home entertainment centers or large-scale cinemas. In general, the multi-segment optical retarder may be part of a commercially available front projector, or maybe provided as part of an aftermarket 3D conversion kit.

In accordance with one aspect of the instant invention there is provided a projection system comprising: an imager for sequentially emitting left-eye and right-eye images; an optical retarder having a plurality of segments including a first segment and a second segment, the first segment for converting left-eye images to a first polarization, the second segment for converting right-eye images to a second other polarization; and an actuator for one of rotating and translating the optical retarder according to timing synchronization of the left-eye and right-eye image emissions such that a polarized beam of light incident on the first segment samples a first fast axis orientation that is substantially constant relative to itself over time as the optical retarder is one of rotated and translated, and such that the polarized beam of light incident on the second segment samples a second other fast axis orientation that is substantially constant relative to itself over time as the optical retarder is one of rotated and translated.

In accordance with another aspect of the instant invention there is provided an optical wheel retarder comprising: a transparent disc having a center and a plurality of sectors, the plurality of sectors including a first sector and a second sector, the first sector including a first waveplate having a predetermined retardance magnitude, the second sector including a second waveplate having the predetermined retardance magnitude, each of the first and second waveplates having a fast axis orientation that varies with azimuthal angle about the center of the disk, wherein the predetermined retardance magnitude provides one of quarter-wave and half-wave retardance within a predetermined wavelength range.

In accordance with another aspect of the instant invention there is provided a projection system comprising: an imager for sequentially emitting left-eye and right-eye images; an optical retarder having a plurality of segments, the plurality of segments including a first segment and a second segment, the first and second segments having a substantially same and uniform retardance magnitude, each of the first and second segments having a spatially varying fast axis orientation, the first segment including a first region having a first fast axis azimuth orientation relative to an incident polarization state at a first instant when the first region is in an optical path, the second segment including a second region having a second fast axis azimuth orientation relative to an incident polarization state at a second instant when the second region is in the optical path; and an actuator for rotating the optical retarder according to timing synchronization of left-eye and right-eye image emission, wherein the first fast axis azimuth orientation is one of 90 degrees and 45 degrees relative to the second fast axis azimuth relative orientation.

In one embodiment, each of the first and second segments has a spatially varying fast axis orientation. In one embodiment, each of the first and second segments includes at least a segment of a vortex retarder.

BRIEF DESCRIPTION OF THE DRAWINGS

Further features and advantages of the present invention will become apparent from the following detailed description, taken in combination with the appended drawings, in which:

FIG. 2b is a schematic diagram of a front view of the stationary linear polarizer used in the projection system illustrated in FIG. 2a;

FIG. 2c is a schematic diagram of a front view of the actuated half-wave optical retarder used in the projection system illustrated in FIG. 2a;

FIG. 4a is a schematic diagram showing a side view of a projection system in accordance with another embodiment of the instant invention wherein the right-eye and left-eye images are projected using circularly polarized light;

FIG. 4b is a schematic diagram of a front view of the stationary linear polarizer used in the projection system illustrated in FIG. 4a;

FIG. 4c is a schematic diagram of a front view of one embodiment of the actuated quarter-wave optical retarder used in the projection system illustrated in FIG. 4a;

FIG. 4d is a schematic diagram illustrating the fast axis orientation of the actuated optical retarder illustrated in FIG. 4c sampled by a predetermined illumination field before the wheel is rotated 180 degrees counter clockwise;

FIG. 4e is a schematic diagram illustrating the fast axis orientation of the actuated optical retarder illustrated in FIG. 4c sampled by a predetermined illumination field after the wheel is rotated 180 degrees counter clockwise;

FIG. 5a is a schematic diagram of a front view of another embodiment of an actuated quarter-wave optical retarder used in the projection system illustrated in FIG. 4a;

FIG. 5b is a schematic diagram of a front view of yet another embodiment of an actuated quarter-wave optical retarder used in the projection system illustrated in FIG. 4a;

FIG. 6b is a schematic diagram of a front view of the stationary spatially varying polarizer used in the projection system illustrated in FIG. 6a;

FIG. 6c is a schematic diagram of a front view of the actuated quarter-wave optical retarder used in the projection system illustrated in FIG. 6a;

FIG. 7b is a schematic diagram of a front view the actuated quarter-wave optical retarder translated between a first position (left) to a second position (right), used in the projection system illustrated in FIG. 6a.

It will be noted that throughout the appended drawings, like features are identified by like reference numerals.

DETAILED DESCRIPTION

Figure 1:
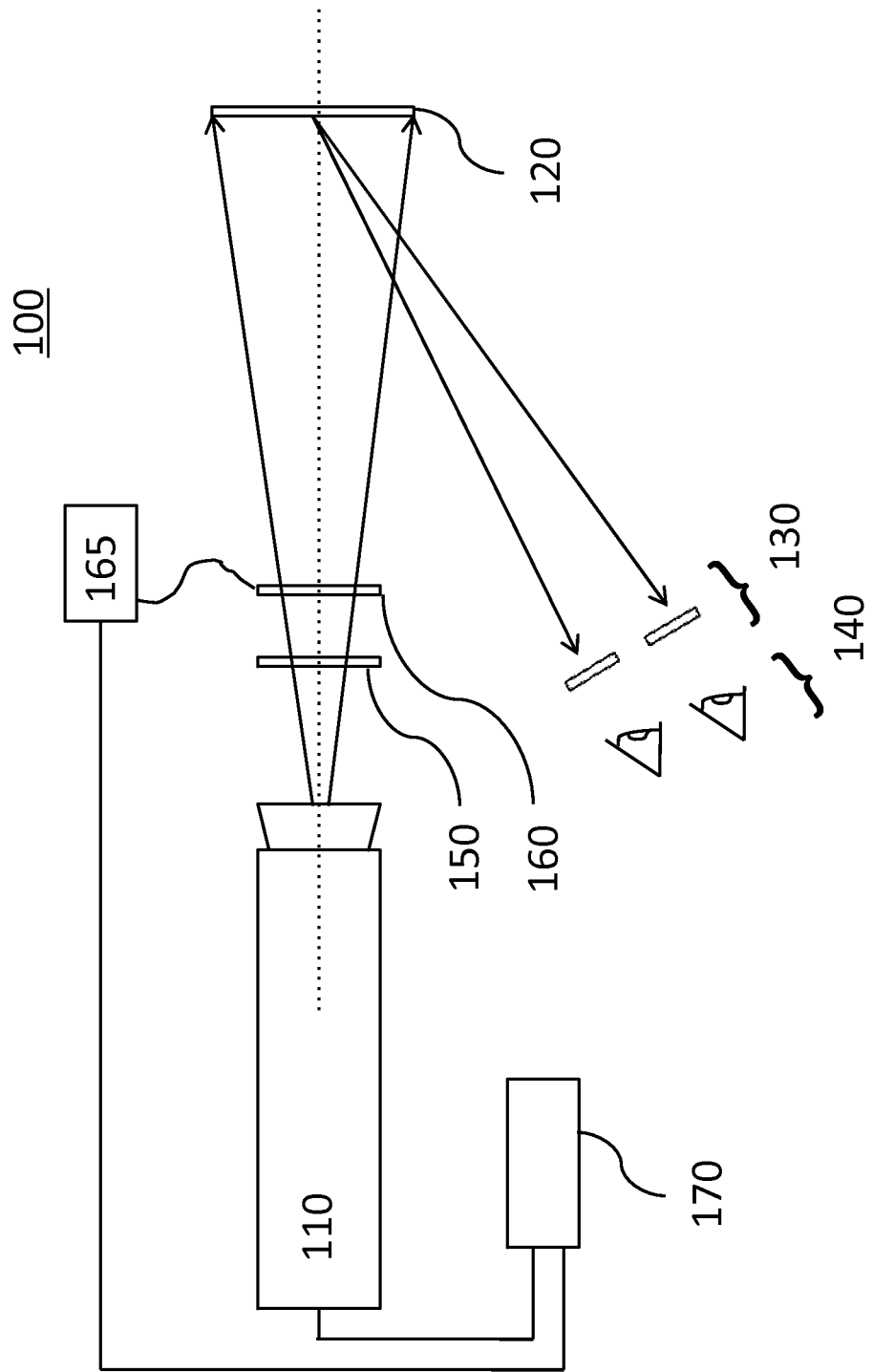
FIG. 1 is a schematic diagram showing a side view of a projection system in accordance with an embodiment of the instant invention.

Referring to FIG. 1, there is shown a projection system in accordance with one embodiment of the instant invention. The projection system 100 includes an image projector 110, a projection screen 120, and eyewear 130, which is typically worn by a viewer 140. The projection system 100 also includes a stationary polarizer 150, a mechanically actuated optical retarder 160, and a controller 170.

The projector 110 is used to generate stereoscopic images that are projected onto the projection screen 120. For example, in one embodiment the stereoscopic images correspond to original movie content originated from two cinema cameras separated by a small angle. In another embodiment, the stereoscopic images correspond to still photography originated from two cameras providing different viewpoints. In yet another embodiment, the stereoscopic images are animated and/or computer generated. Various projector architectures are suitable for use in the projector 110. For example, suitable projector architectures include digital light processing (DLP), liquid crystal on silicon (LCoS), and transmissive liquid crystal display (xLCD). As is well know in the art, the projection architecture will typically include a light source, an imager, and a projection lens (not shown). The stereoscopic images may be in digital or analog format. In general, the projector 110 alternates between the two viewpoints at a rate faster than the viewer 140 can perceive so that the viewer does not observe flicker or any other discontinuity.

The projection screen 120 is typically a polarization-maintaining screen used to substantially retain the polarization introduced by the stationary polarizer 150 and/or optical retarder 160, and to reflect more light to the viewer 140. For example, in one embodiment the projection screen is coated with aluminum or silver.

The eyewear 130 allows different eyes of the viewer 140 to see the two different viewpoints of the image so that the viewer can process the 3D image. Typically, the eyewear 130 includes at least one pair of passive polarized viewing glasses. For example, in one embodiment the eyewear 130 is a pair of polarized viewing glasses including a first lens for a first eye having a right circular analyzer, and a second other lens for a second other eye having a left circular analyzer. In other embodiments, the eyewear 130 includes a first lens for a first eye having a first linear polarizer, and a second other lens for a second other eye having a second linear polarizer, wherein the fast axes of the first and second polarizers are orthogonal. In general, the type of analyzer (e.g., circular, linear, etc) used in the passive eyewear 130 will be selected in dependence upon the type of optical retarder (e.g., half-wave or quarter-wave) used to form the actuated optical retarder 160.

The stationary polarizer 150 preconditions the polarization state at all points of the illumination field of light incident thereon. More specifically, the stationary polarizer 150 preconditions the light such that the linear polarization orientation will be optimal at all points as it encounters the actuated optical retarder 160.

The actuated optical retarder 160 includes a plurality of segments, including a first segment for converting the polarized light transmitted from the stationary polarizer 150 to a first polarization (e.g., horizontal or right-circular polarized) and a second segment for converting the polarized light transmitted from the stationary polarizer 150 to a second other polarization (e.g., vertical or left-circular polarized). The optical retarder 160 is coupled to an actuator 165 used to rotate, translate, and/or oscillate the optical retarder 160 such that the fast orientation in each segment, for a given area of light incidence, is substantially constant relative to itself over time. For example, in one embodiment the actuator 165 includes a motor coupled to a mount of the optical retarder 160, wherein the mount positions the optical retarder such that light transmitted from the projection lens (not shown) is incident on one of the first and second segments of the actuated optical retarder 160 and forms an illuminated spot. Accordingly, at each point within the beam's cross section, the incident beam of light will see a substantially constant effective fast axis azimuthal orientation, relative to the incident polarization state at each point, for the time each segment is rotated/translated/oscillated in the path of the beam.

The controller 170 drives the actuator 165 according to timing synchronization of the left-eye and right-eye image emissions. In particular, the controller 170 is used to synchronize the rotation/translation/oscillation speed provided by the actuator 165 with the emission of the left- and right-eye images such that alternating polarized images (e.g., left and then right-circularly polarized images, or horizontally and then vertically polarized images) are projected onto the polarization maintaining screen 130 and reflected to the viewer 140. More specifically, each of the first and second sections of the actuated retarder 160 transmits content from the first and second viewpoints, respectively. In addition, the controller 170 drives the actuator 165 with a speed that allows the fast orientation for a given area of incidence on the actuated optical retarder 160 to be substantially constant over time and over the area of incidence.

In operation, the single projector 110 is used to project stereoscopic images. For example, if the stereoscopic images correspond to digital data then, in one embodiment, the projector alternately projects left- and right-eye frames. The left- and right-eye frames are transmitted to the stationary polarizer 150, where they are preconditioned, and are transmitted to the actuated optical retarder 160. In dependence upon what section of the actuated optical retarder 160 the incident light impinges, the retarder 160 will impose a phase change to the linearly polarized light. As the actuator moves the optical retarder 160 in synchronized timing with the emission of the left- and right-eye frames, the left- and right-eye images will be projected with alternating polarizations onto the projection screen 120. The viewer 140 having glasses 130 views the left- and right-eye frames reflected from the screen 120. More specifically, the right-eye covered by a first analyzer will see only the right-eye images having a first polarization, whereas the left-eye covered by a second analyzer will see only left-eye images having a second polarization. Although not ideal, it is acceptable for some crosstalk to occur. For example, each eye can receive some of the light intended for the other eye. The net result is that the left eye receives substantially one viewpoint and the right eye receives substantially the other viewpoint. Upon processing the two viewpoints, the viewer 140 perceives a three-dimensional image of the scene.

Figure 2A:
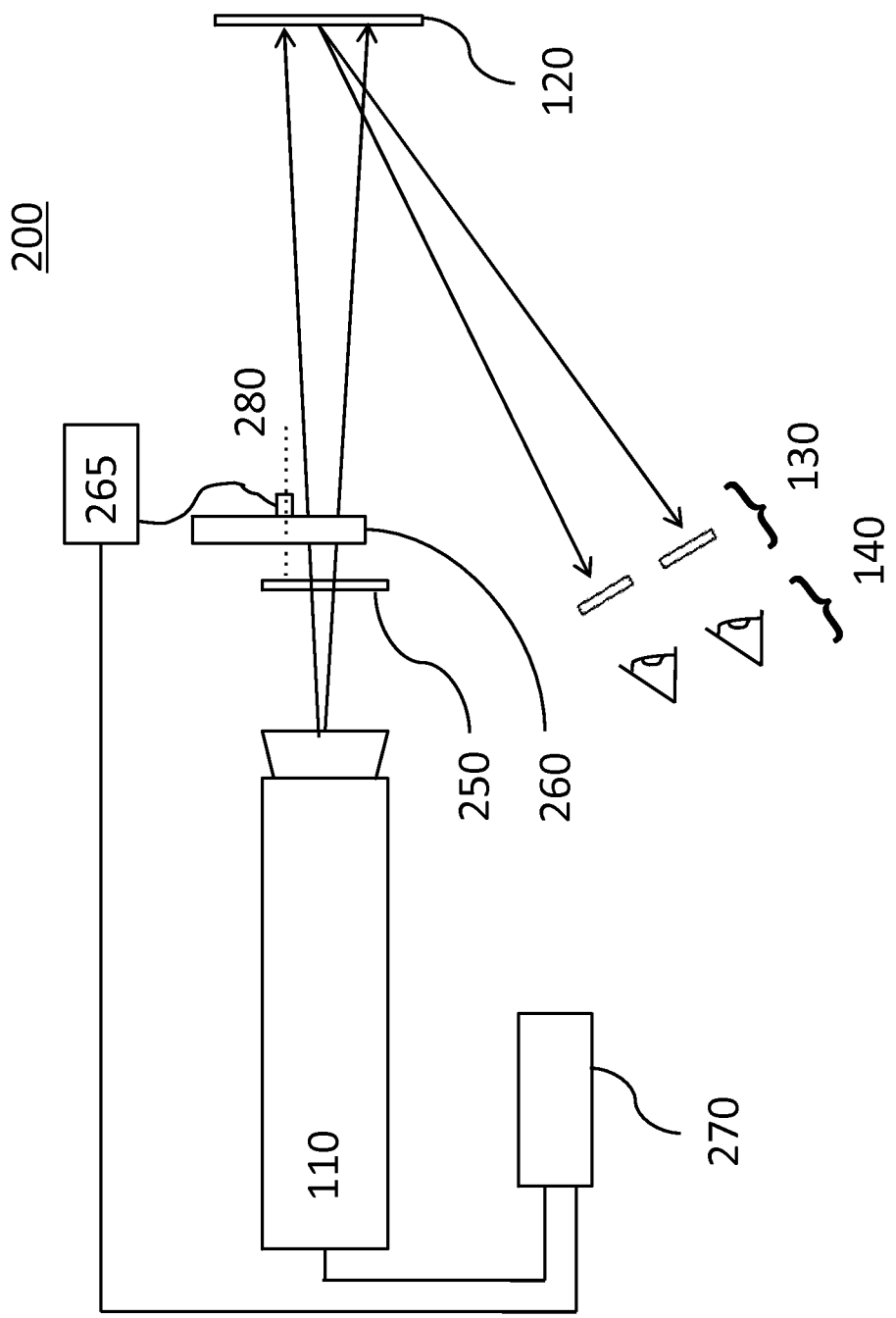
FIG. 2a is a schematic diagram showing a side view of a projection system in accordance with another embodiment of the instant invention wherein the right-eye and left-eye images are projected using linearly polarized light.

Referring to FIG. 2a, there is shown a projection system in accordance with one embodiment of the instant invention. The projection system 200 includes an image projector 110, a projection screen 120, and eyewear 130, which is typically worn by a viewer 140, as described in the embodiment illustrated in FIG. 1. The projection system 200 also includes a stationary polarizer 250, a mechanically actuated optical retarder 260, and a controller 270.

The stationary polarizer 250 preconditions the polarization state at all points of the illumination field of light incident thereon. More specifically, the stationary polarizer 250 preconditions the light such that the linear polarization orientation will be optimal at all points as it encounters the actuated optical retarder 260. Referring to FIG. 2b, the stationary polarizer 250 is a linear polarizer having a uniform fast axis orientation, oriented to ensure that all light projected from the projector 110 has the same polarization. For illustrative purposes, the stationary polarizer 250 is illustrated as a wire grid polarizer providing horizontally polarized light. Alternatively, the stationary polarizer 250 is another linear polarizer (e.g., a dichroic sheet absorptive polarizer) and/or provides a different linear polarization (e.g., vertical). In this embodiment, the light 266 incident on the stationary polarizer 250 is depicted as unpolarized light (e.g., as for example, may be the case if the projection architecture is DLP). In other embodiments, the light 266 incident on the stationary polarizer 250 is also horizontally polarized such that the stationary polarizer 250 functions as a clean-up polarizer.

The actuated optical retarder 260 selectively provides a retardance (i.e. change in polarization state dependent upon its fast axis orientation and retardance value) to the light transmitted from the stationary polarizer 250. Referring to FIG. 2c, the optical retarder 260 has a plurality of segments, including a first segment 261 for ensuring the horizontally polarized light transmitted from the stationary polarizer 250 has a first polarization (e.g., horizontal) and a second segment 262 for ensuring that the horizontally polarized light transmitted from the stationary polarizer 250 has a second other polarization (e.g., vertical). Each segment has a substantially uniform retardance value. In this embodiment each segment provides half-wave retardance.

Referring again to FIG. 2c, the fast axis (illustrated with arrows) of the actuated optical retarder 260 is spatially varied within each segment 261, 262. More specifically, the azimuthal angle of the fast axis varies within each segment, while the polar angle is constant (e.g., the polar angle is typically selected such that the optical retarder is configured as an A-plate or an O-plate). In general, the azimuthal angle of the spatially varying fast axis in each sector is substantially constant in a radial direction and changes tangentially (i.e. the azimuthal angle of the fast axis varies about the center of rotation 280). If the optical retarder is fabricated from a single layer of birefringent material the fast axis will be the spatially varying fast axis of the birefringent material. If the optical retarder is an achromatic retarder (e.g., a multi-layer design wherein two or more retarders are stacked or laminated in order to make the optical retarder achromatic) then the fast axis is an effective fast axis. The term "effective fast axis" refers to what appears to be the fast-axis when the optical retarder is assumed to be a simple single layer retarder. The azimuthal angle refers to the azimuthal orientation of the fast axis projected in the plane of the optical retarder, measured relative to some arbitrary reference point. The polar angle refers to the out-of-plate tilt of the fast axis. The in-plane retardance of the optical retarder 260 is determined by the birefringence of the material, the polar angle, and the thickness of the birefringent layer(s). The two segments 261, 262 are separated by a boundary along which there is a 45 degree offset in the azimuthal angle of the fast axis 267. At this boundary, the transmitted polarization switches between two orthogonal states, which in this case are orthogonal linear polarization states (i.e., horizontal and vertical).

Figure 2E:
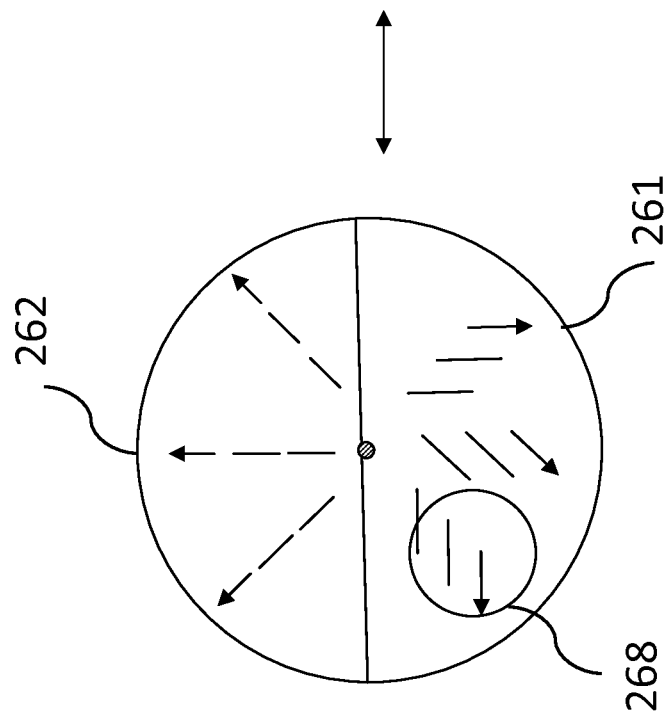
FIG. 2e is a schematic diagram illustrating the fast axis orientation of the actuated optical retarder illustrated in FIG. 2c sampled by a predetermined illumination after the wheel is rotated 90 degrees counter clockwise.
Figure 2D:
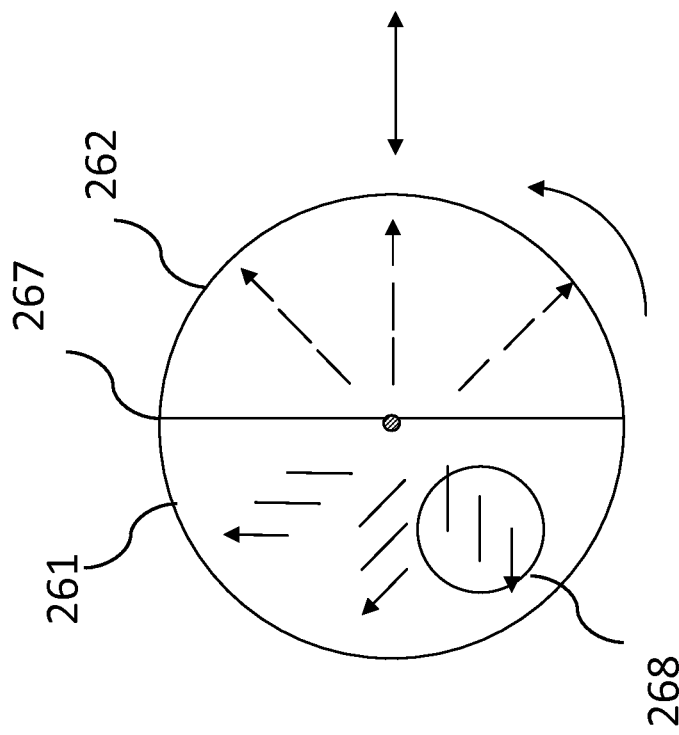
FIG. 2d is a schematic diagram illustrating the fast axis orientation of the actuated optical retarder illustrated in FIG. 2c sampled by a predetermined illumination field before the wheel is rotated 90 degrees counter clockwise.

The spatially varied fast axis within each segment 261, 262 is designed to provide a constant fast axis orientation at the illumination spot 268 as the retarder 260 is rotated about the rotation axis 280. For example, referring to FIGS. 2d and 2e the light incident at illumination spot 268 will see the same fast axis orientation for segment 261 even after the optical rotator 260 has been rotated 90 degrees counter-clockwise. Accordingly, the fast axis orientation within the illumination spot is substantially constant relative to itself over time. Since the fast axis orientation within the illumination field may vary in dependence upon the size of the illumination spot 268 and its distance from the center of rotation, the fast axis may actually be an average fast axis orientation.

Figure 2G:
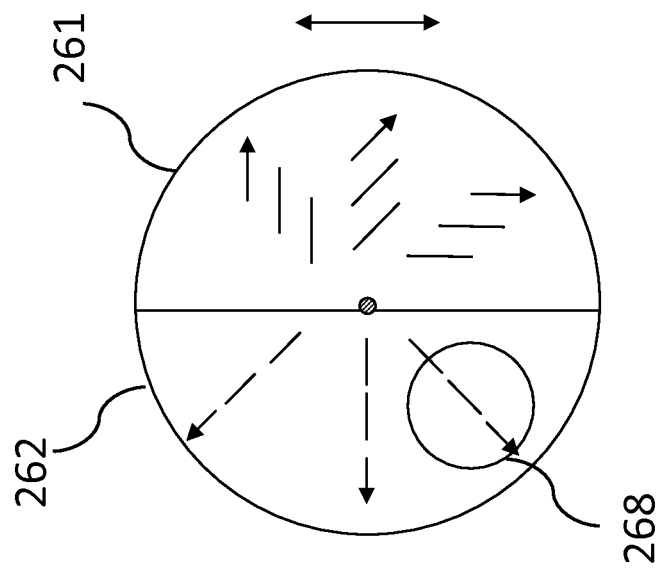
FIG. 2g is a schematic diagram illustrating the fast axis orientation of the actuated optical retarder illustrated in FIG. 2c sampled by a predetermined illumination field and after the wheel is rotated 180 degrees counter clockwise.
Figure 2F:
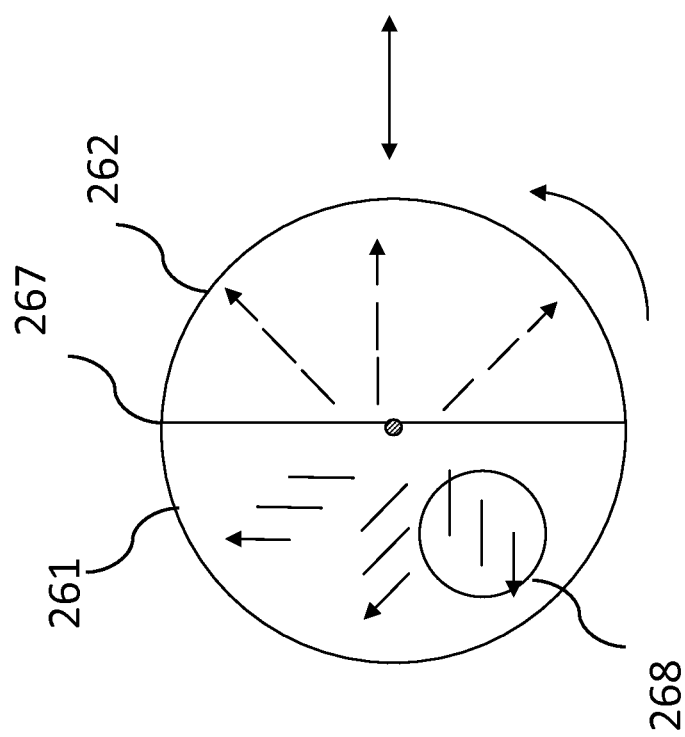
FIG. 2f is a schematic diagram illustrating the fast axis orientation of the actuated optical retarder illustrated in FIG. 2c sampled by a predetermined illumination field before the wheel is rotated 180 degrees counter clockwise.

In contrast, the fast axis orientation between segments, for a given illumination field, will differ by 45 degrees. As discussed above, while the azimuthal angle of the fast axis is spatially varied across the surface of the optical retarder 260, the polar angle and thickness of the birefringent layer is selected to provide half-wave retardance (or an odd multiple of half-wave retardance). As is well known in the art, a half-wave plate produces a λ/2 phase shift and can rotate the polarization of linearly polarized light to twice the angle between the retarder fast axis and the plane of polarization. Accordingly, if the fast axis of the half-wave plate is at 45 degrees to the polarization plane, the polarization will be rotated by 90 degrees. In contrast, if the fast axis of the half-wave plate is parallel (or perpendicular) to the polarization plane, as illustrated in the illumination spot in FIG. 2c, the polarization will not be rotated. Referring to FIGS. 2f and 2g, which show a fast axis orientation for a given illumination field at illumination spot 268 for the first 261 and second 262 segments, it is clear that rotating the optical retarder 260 about the central rotation axis 280 by 180 degrees counter-clockwise will switch the output from horizontally polarized light to vertically polarized light. Accordingly, continuously rotating the optical retarder 260 about the rotation axis 280 will result in the alternating production of horizontally and vertically polarized light (e.g., which can be synchronized with the projection of right-eye and left-eye images).

In one embodiment, the spatially varying fast axis is achieved by forming each segment 261, 262 as an optical vortex retarder, or as part of an optical vortex retarder. An optical vortex retarder, which is also referred to herein simply as a vortex retarder, refers to a class of waveplates that has a spatially varying fast axis that rotates around a point. More specifically, an azimuthal angle of the fast axis rotates about a point. Note that while the azimuthal angle of the fast axis of a vortex retarder rotates about a single point, the polar angle of the fast axis is typically constant across a surface of the retarder (i.e., vortex retarders typically have a spatially uniform retardance value).

Figure 3B:
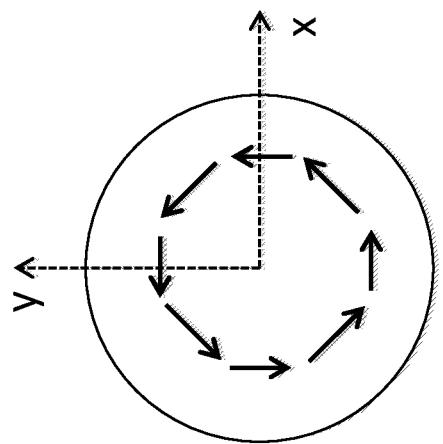
FIG. 3b is a schematic diagram of an optical vortex retarder having a tangentially aligned fast axis.
Figure 3C:
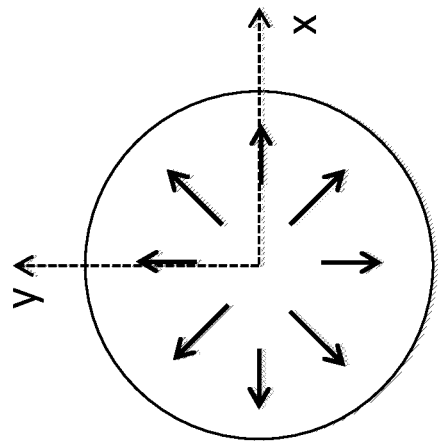
FIG. 3c is a schematic diagram of an optical vortex retarder having a radially aligned fast axis.
Figure 3A:
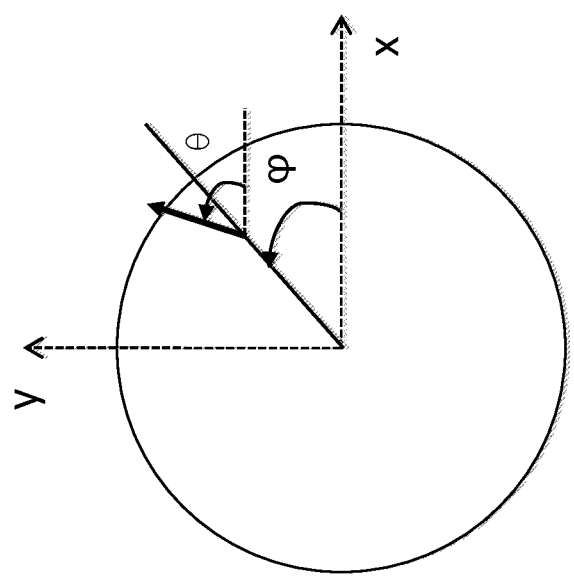
FIG. 3a is a schematic diagram showing the fast axis azimuth orientation $\theta$ of an optical vortex retarder at one azimuthal location $\phi$.

In general, the spatially varying fast axis azimuth of a vortex retarder will vary with azimuthal location on the vortex retarder in a predetermined relationship. For example, referring to FIG. 3a, the spatially varying fast axis azimuth θ typically varies with azimuthal location ϕ according to:

$$\theta(\phi) = \alpha\phi + \theta(0) \quad (1)$$

where α is a constant equal to the rate of change in fast axis azimuth with respect to azimuthal location. Note that both the fast axis azimuth θ and the azimuthal location ϕ are measured relative to a predetermined reference point (e.g., shown as the x-axis). The fast axis azimuth at this reference point is θ(0). When θ(0)=90 degrees as illustrated in FIG. 3b the fast axis is said to be tangentially-aligned. When θ(0)=0 degrees as illustrated in FIG. 3c the fast axis is said to be radially-aligned.

Figure 3D:
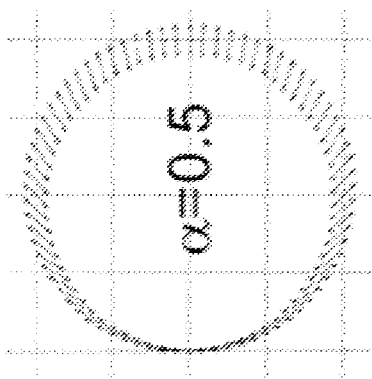
FIG. 3d shows examples of optical vortex retarders having modes equal to 1, 2, −1, and −2.
Figure 3D:
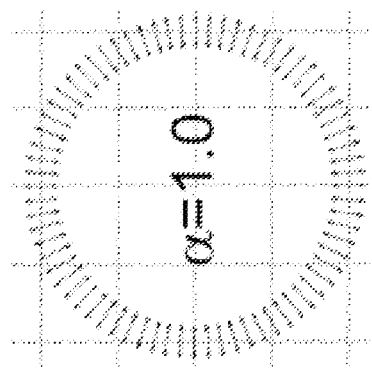
Figure 3D:
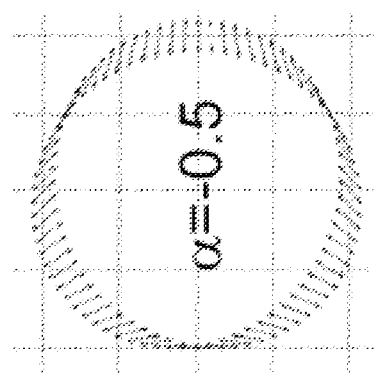
Figure 3D:
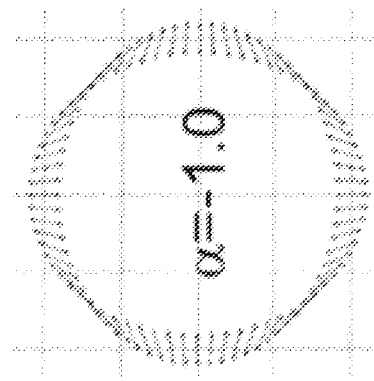

Referring again to Equation (1), the spatially varying fast axis θ will be only continuous at all φ if α=m/2, where m is an integer referred to as the mode of the vortex retarder. In fact, vortex retarders are often characterized according to their mode (e.g., m=2α). For example, the vortex retarders illustrated in FIGS. 3b and 3c are m=2 vortex retarders. Notably, m=2 vortex retarders (e.g., wherein α=1) correspond to the special case wherein a 1 degree counter clockwise rotation in azimuthal location corresponds to a 1 degree increase in fast axis azimuth orientation (i.e., a 1 degree increase in the fast axis azimuth orientation in the counter clockwise direction). In contrast, in a m=−2 vortex retarder (e.g., wherein α=−1) a 1 degree counter clockwise rotation in azimuthal location corresponds to a 1 degree decrease in fast axis azimuth orientation (i.e., a 1 degree increase in the fast axis azimuth orientation in the clockwise direction). FIG. 3d shows examples of vortex retarders having modes equal to 1, −1, 2, and −2. (Note that m=0 is a degenerate case, which is not really considered to be a vortex alignment, but rather describes uniform alignment.)

In the embodiment illustrated in FIG. 2c, each of the first 261 and second 262 segments is formed from at least part of an m=2 vortex retarder such that the vortex is offset by 45 degrees between segments. The optical vortex retarder 260 is mounted such that the azimuthal angle of the fast axis (or effective fast axis) of each segment of the vortex retarder rotates about a point coincident with the center of mechanical rotation (i.e., about rotation axis 280). Accordingly, the fast axis or effective fast axis angle will vary in a gradual and continuous manner about the point according to a linear relationship with azimuthal position (i.e. fast axis angle=θ=(m/2)φ+δ, where φ is the azimuthal position about the center point relative to an arbitrary reference azimuth, and m is the vortex order, and δ is an offset angle relative to the arbitrary reference azimuth). In the embodiment illustrated in FIGS. 2a-g, the optical retarder 260 is mounted such that the light transmitted from the projector is incident on a region of the optical retarder where the fast axis or effective fast axis of the retarder in the optical path is substantially +/−90 degrees or +/−45 degrees orientation relative to the orientation of the incident linear polarization. Accordingly, when the segmented vortex retarder is rotated by the actuator about the rotation axis, it alternately provides two orthogonal linear polarized states. More specifically, the actuator rotates the segmented vortex retarder such that the incident polarized light (e.g., first having passed through a linear polarizer 250 and/or an optional aperture (not shown)) sees a substantially constant effective fast axis azimuthal orientation in each segment that is either +/−90 degrees or +/−45 degrees relative to the orientation of the incident linear polarization, as the segmented retarder is rotated in the optical path. In other embodiments (not shown), the optical retarder 260 is mounted such that the light transmitted from the projector is incident on a region of the optical retarder where the azimuthal angle of the fast axis or effective fast axis of the retarder in the optical path is substantially +/−22.5 degrees. More specifically, the optical retarder is mounted such that the fast axis of the half-wave plates 261 and 262 were +22.5 and −22.5 degrees relative to the orientation of the incident polarization (i.e., 0 degrees), respectively. In this case, the first segment 261 will rotate the polarization +45 degrees, while the second segment 262 will rotate the polarization by −45 degrees. Alternatively, the actuated retarder is mounted as described above, and the stationary polarizer is rotated to provide linearly polarized light that is at +/−22.5 degree relative to a linear polarization. Providing an offset of +/−22.5 degrees between the fast axis of each segment in the actuated retarder relative to the incident polarization advantageously equalizes the polarization dispersion between segments.

In operation, the single projector 110 is used to project stereoscopic images. For example, if the stereoscopic images correspond to digital data then, in one embodiment, the projector alternately projects left- and right-eye frames. The left- and right-eye frames are transmitted to the stationary polarizer 250, where they horizontally polarized. As the actuator rotates the optical retarder 260 in synchronized timing with the emission of the left- and right-eye frames, the left- and right-eye images will be projected with alternating horizontal/vertical polarizations onto the projection screen 120. The viewer 140 having glasses 130 views the left- and right-eye frames reflected from the screen 120. More specifically, the right-eye covered by a first linear analyzer will see only the right-eye images having a first polarization, whereas the left-eye covered by a second linear analyzer will see only left-eye images having a second polarization. Although not ideal, it is acceptable for some crosstalk to occur. For example, each eye can receive some of the light intended for the other eye. The net result is that the left eye receives substantially one viewpoint and the right eye receives substantially the other viewpoint. Upon processing the two viewpoints, the viewer 140 perceives a three-dimensional image of the scene.

Referring to FIG. 4a, there is shown a projection system in accordance with another embodiment of the instant invention. The projection system 400 includes an image projector 110, a projection screen 120, and eyewear 130, which is typically worn by a viewer 140, as described in the embodiment illustrated in FIG. 1. The projection system 400 also includes a stationary polarizer 450, a mechanically actuated optical retarder 460, and a controller 470.

The stationary polarizer 450 preconditions the polarization state at all points of the illumination field of light incident thereon. More specifically, the stationary polarizer 450 preconditions the light such that the linear polarization orientation will be optimal at all points as it encounters the actuated optical retarder 460. Referring to FIG. 4b, the stationary polarizer 450 is a linear polarizer having a uniform fast axis orientation, oriented to ensure that all light projected from the projector 110 has the same polarization. For illustrative purposes, the stationary polarizer 450 is illustrated as a wire grid polarizer providing horizontally polarized light. Alternatively, the stationary polarizer 450 is another linear polarizer (e.g., a dichroic sheet absorptive polarizer) and/or provides a different linear polarization (e.g., vertical). In this embodiment, the light 466 incident on the stationary polarizer 450 is depicted as unpolarized light (e.g., as for example, may be the case if the projection architecture is DLP). In other embodiments, the light incident 466 on the stationary polarizer 450 is also horizontally polarized such that the stationary polarizer 450 functions as a clean-up polarizer.

The actuated optical retarder 460 selectively provides a retardance to the light transmitted from the stationary polarizer 450. Referring to FIG. 4c, the optical retarder 460 has a plurality of segments, including a first segment 461 for ensuring the horizontally polarized light transmitted from the stationary polarizer 450 has a first polarization (i.e., left circular or left handed circular (LH)) and a second segment 462 for ensuring that the horizontally polarized light transmitted from the stationary polarizer 450 has a second other polarization (i.e., right circular or right handed circular (RH)). Each segment has a substantially uniform retardance value. In this embodiment each segment provides quarter-wave retardance. The two segments 461, 462 are separated by a boundary along which there is a 90 degree offset in the azimuthal angle of the fast axis. At this boundary 467, the transmitted polarization switches between two orthogonal states, which in this case are RH and LH states.

Referring again to FIG. 4*c*, the fast axis (illustrated with arrows) of the actuated optical retarder 460 is spatially varied within each segment 461, 462. More specifically, the azimuthal angle of the fast axis varies within each segment, while the polar angle is constant (e.g., the polar angle is typically selected such that the optical retarder is configured as an A-plate or an O-plate). In general, the azimuthal angle of the spatially varying fast axis in each sector is substantially constant in a radial direction and changes tangentially. If the optical retarder is fabricated from a single layer of birefringent material the fast axis will be the spatially varying fast axis of the birefringent material. If the optical retarder is an achromatic retarder (e.g., a multi-layer design wherein two or more retarders are stacked or laminated in order to make the optical retarder achromatic) then the fast axis is an effective fast axis. The in-plane retardance of the optical retarder 460 is determined by the birefringence of the material, the polar angle, and the thickness of the birefringent layer(s).

The spatially varied fast axis within each segment 461, 462 is predetermined to provide a constant fast axis orientation at the illumination spot 468 as the retarder 460 is rotated about the rotation axis 480. Accordingly, the fast axis orientation within the illumination spot is substantially constant relative to itself over time. Since the fast axis orientation within the illumination field may vary in dependence upon the size of the illumination spot 468 and its distance from the center of rotation 480, the fast axis may actually be an average fast axis orientation.

In contrast, the fast axis orientation between segments, for a given illumination field, will differ by 90 degrees. As discussed above, while the azimuthal angle of the fast axis is spatially varied across the surface of the optical retarder 460, the polar angle and thickness of the birefringent layer is selected to provide quarter-wave retardance (or an odd multiple of quarter-wave retardance). As is well known in the art, a quarter-wave plate produces a λ/4 phase shift and can change linearly polarized light to circular polarized light when the fast axis of the quarter-wave plate is at a 45 degree angle to the polarization of the incident light. Accordingly, if the fast axis of the quarter-wave retarder is at 45 degrees to the polarization plane, the light transmitted from the polarizer 450 will be converted to left or right circularly polarized light. Since the fast axis orientation between segments, for a given illumination field, differs by 90 degrees, rotation of the optical retarder 460 will alternately produce left and right-circularly polarized light. For example, FIGS. 4*d* and 4*e* show the fast axis orientation between segments being offset by 90 degrees such that as the wheel 460 is rotated 180 degrees counter clockwise, the polarization will switch between left-handed and right-handed circular polarizations is it passes through the first 461 and second 462 segments, respectively.

In one embodiment, the spatially varying fast axis is achieved by forming each segment 461, 462 as an optical vortex retarder, or as part of optical vortex retarder. For example, in one embodiment each of the first 461 and second 462 segments is formed from at least part of an m=2 vortex retarder such that the vortex is offset by 90 degrees between segments. The optical vortex retarder 460 is mounted such that the azimuthal angle of the fast axis (or effective fast axis) of each segment of the vortex retarder rotates about a point coincident with the center of mechanical rotation (i.e. about rotation axis 480). Accordingly, the fast axis or effective fast axis angle will vary in a gradual and continuous manner about the point according to a linear relationship with azimuthal position (i.e. fast axis angle=θ=(m/2)φ+δ, where φ is the azimuthal position about the center point relative to an arbitrary reference azimuth, and m is the vortex order, and δ is an offset angle relative to the arbitrary reference azimuth). In addition, the optical retarder 460 is mounted such that the light transmitted from the projector is incident on a region of the optical retarder where the fast axis or effective fast axis of the retarder in the optical path is substantially +/−45 degrees orientation relative to the orientation of the incident linear polarization (e.g., as illustrated in FIGS. 4*d* and 4*e*). Accordingly, when the segmented vortex retarder is rotated by the actuator about the rotation axis, it alternately provides right and left circularly polarized light. More specifically, the actuator rotates the segmented vortex retarder such that the incident polarized light (e.g., first having passed through a linear polarizer 450 and/or an optional aperture) sees a substantially constant effective fast axis azimuthal orientation in each segment, which is +/−45 degrees relative to the orientation of the incident linear polarization.

In operation, the single projector 110 is used to project stereoscopic images. For example, if the stereoscopic images correspond to digital data then, in one embodiment, the projector alternately projects left- and right-eye frames. The left- and right-eye frames are transmitted to the stationary polarizer 450, where they horizontally polarized. As the actuator 465 rotates the optical retarder 460 in synchronized timing with the emission of the left- and right-eye frames, the left- and right-eye images will be projected with alternating right-handed/left-handed circular polarizations onto the projection screen 120. The viewer 140 having glasses 130 views the left- and right-eye frames reflected from the screen 120. More specifically, the right-eye covered by a first circular analyzer will see only the right-eye images having a first polarization (e.g., RH), whereas the left-eye covered by a second circular analyzer will see only left-eye images having a second polarization (e.g., LH). Although not ideal, it is acceptable for some crosstalk to occur. For example, each eye can receive some of the light intended for the other eye. The net result is that the left eye receives substantially one viewpoint and the right eye receives substantially the other viewpoint. Upon processing the two viewpoints, the viewer 140 perceives a three-dimensional image of the scene.

Figure 5B:
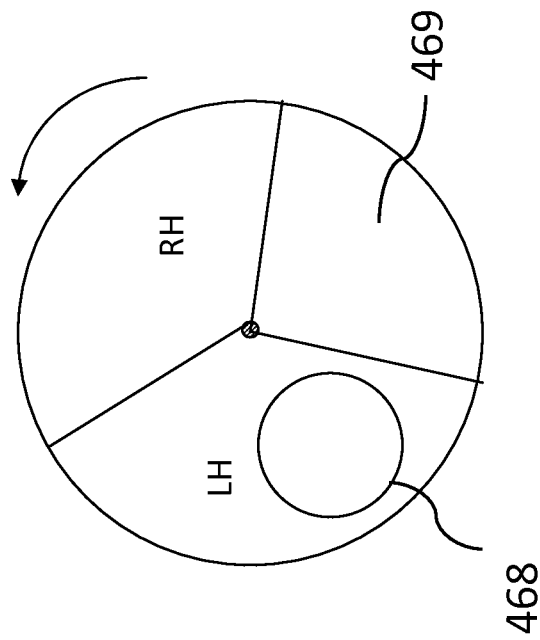
Figure 5A:
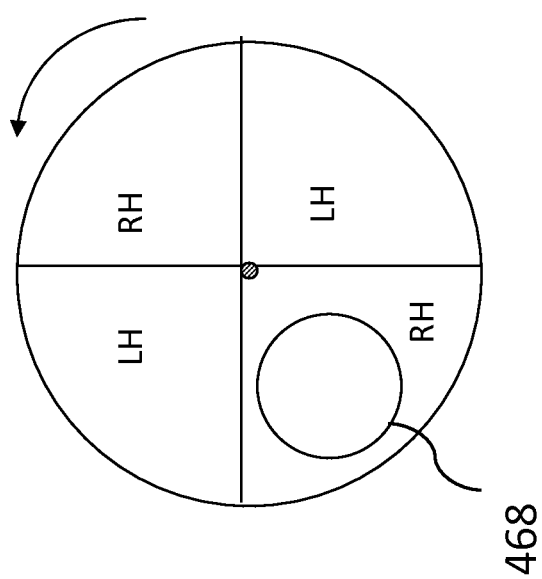

Referring to FIG. 5*a* there is shown an embodiment of the actuated optical retarder 460 wherein the achromatic quarter-wave plate has four segments, each of which is formed from a segment of an m=2 vortex retarder. In this embodiment, the segments alternate between left and right circular segments, thus reducing the required rotation speed.

Referring to FIG. 5*b* there is shown an embodiment of the actuated optical retarder 460 wherein two segments are achromatic quarter-wave plates with m=2 vortex alignment, and one 469 of which provides substantially no effect on the transmitted polarization state relative to that of the incident illumination (i.e. has no retardance value; or is a retarder whose fast axis azimuthal angle is aligned parallel or perpendicular to the incident polarization state within the illumination spot and is substantially constant relative to itself over time) or is opaque. Advantageously, if the optical retarder includes a transparent segment that does not provide an effect on the transmitted polarization state relative to that of the incident illumination, the image projected through that segment will be viewable in both the left and right channels.

In the embodiments described with reference to FIGS. 2*a*, 4*a*, 5*a*, and 5*b*, the mechanically actuated optical retarder 260, 460 is shown mounted such that the light transmitted from the corresponding stationary polarizer is incident on a relatively small area of the optical retarder 260, 460. In fact, a limitation of these embodiments is that the correctly oriented fast axis of the optical retarder (e.g., an achromatic quarter-wave plate (AQWP) or an achromatic half-wave plate (AHWP)) is limited to a small angular region of the wheel. This constraint arises due to the fast axis over a finite area of incidence at an instant being non-uniform with respect to a common incident linear polarization state over that same area. In other words, the illumination field samples a range of orientations for which only one would be optimal for any given uniform linear polarization input. To minimize this problem, the illumination field on the wheel should be small in size, and should be located far from the center of the vortex/axis of rotation. Alternatively, the stationary linear polarizer 250, 450 could be replaced with a stationary achromatic spatially-varying polarizer used to create an illumination field having azimuthally varying linear polarization (e.g., radially or tangentially polarized light). In particular, in cases where a segmented retarder wheel has segments with an m=2 vortex orientation of their fast-axes, it is advantageous to pre-polarize the light with an m=2 vortex oriented linear polarizer to produce radial-linear polarized light such that the incident polarization upon each vortex retarder segment has a uniform relative orientation to a vortex retarder segment over a finite area of incidence at an instant.

Figure 6A:
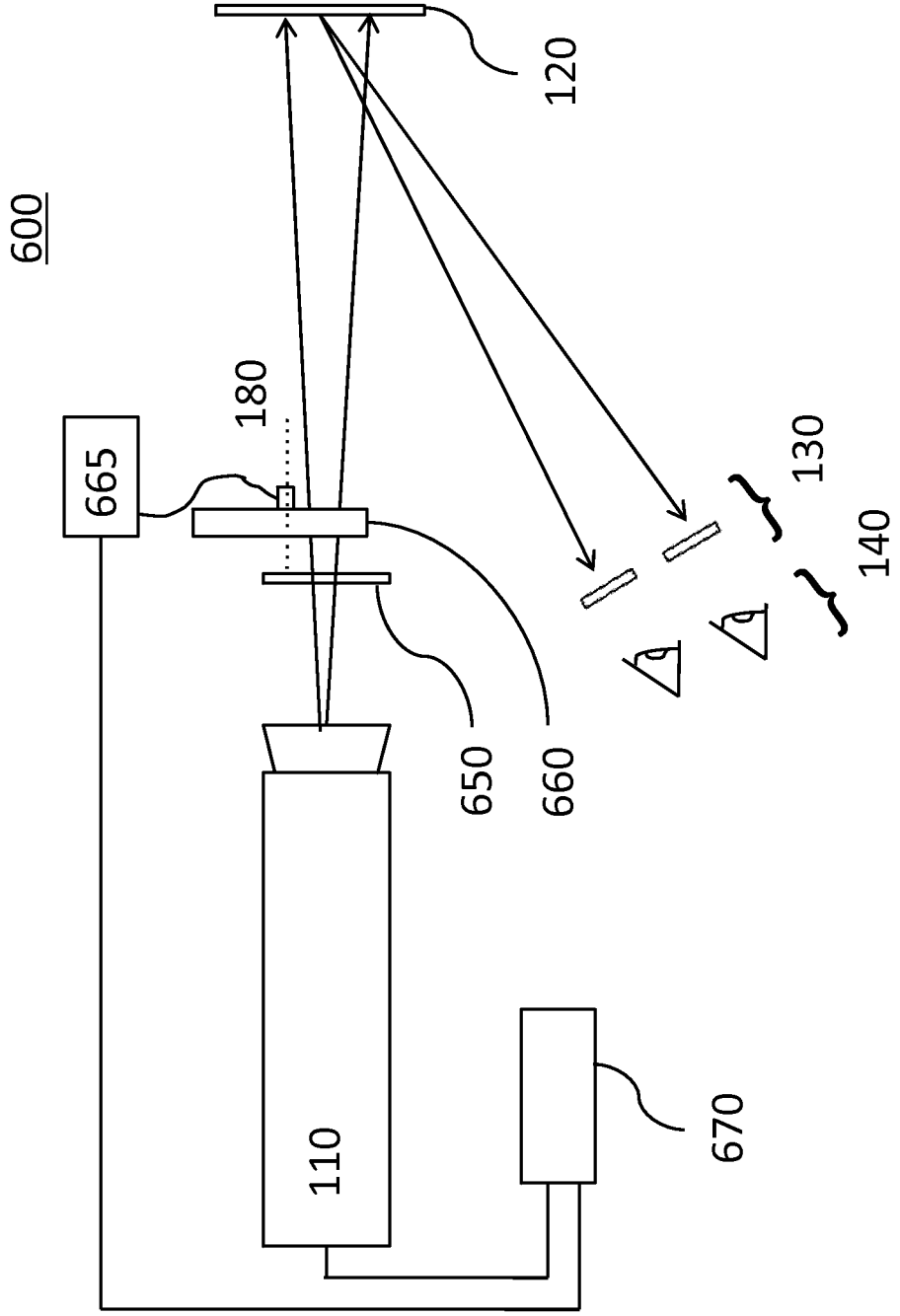
FIG. 6a is a schematic diagram showing a side view of a projection system in accordance with another embodiment of the instant invention wherein the right-eye and left-eye images are projected using circularly polarized light.

Referring to FIG. 6a, there is shown a projection system in accordance with another embodiment of the instant invention. The projection system 600 includes an image projector 110, a projection screen 120, and eyewear 130, which is typically worn by a viewer 140, as described in the embodiment illustrated in FIG. 1. The projection system 600 also includes a stationary polarizer 650, a mechanically actuated optical retarder 660, and a controller 670.

Figure 6C:
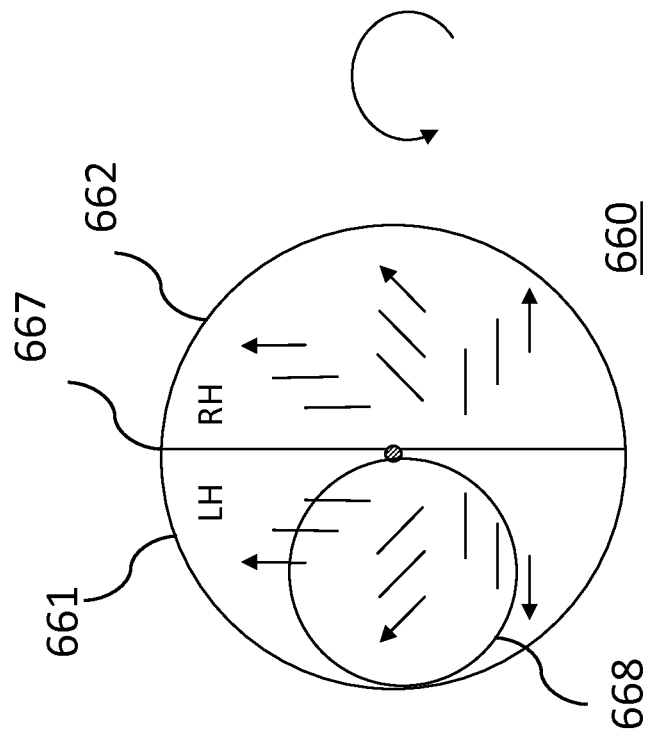
Figure 6B:
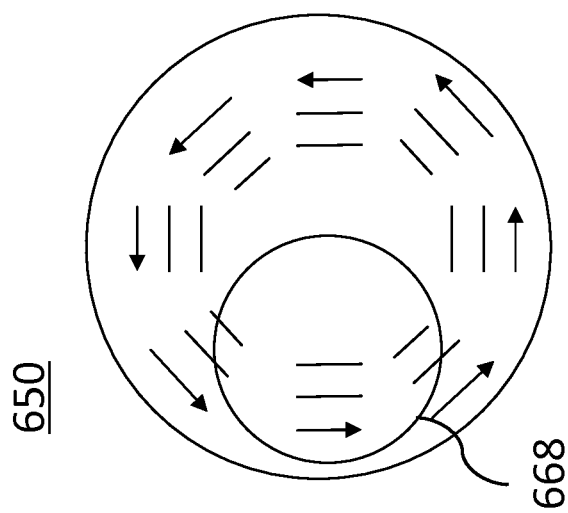

The stationary polarizer 650 preconditions the polarization state at all points of the illumination field of light incident thereon. More specifically, the stationary polarizer 650 preconditions the light such that the linear polarization orientation will be optimal at all points as it encounters the actuated optical retarder 660. Referring to FIG. 6b, the stationary polarizer 650 is a spatially-varying polarizer that converts the incident light into an m=2 polarization vortex. More specifically, the spatially-varying polarizer provides linearly polarized light having a polarization that varies across a cross-section of the beam of light. Preferably, the optical vortex provided by the spatially-varying polarizer is mapped to the spatially-varied fast axis orientation of the optical retarder 660 such that the linear polarization orientation is optimal all points of the illumination field. For example, in on embodiment the stationary polarizer 650 is an azimuthally varying vortex polarizer used to convert a uniform linear polarization into a radially oriented linear polarization. In other embodiments, the stationary polarizer produces tangentially oriented linear polarization (e.g., as depicted in 650 in FIG. 6b). In other embodiments, the stationary polarizer produces another m=2 polarization vortex. In each embodiment, the stationary polarizer 650 is typically an achromatic spatially varying polarizer formed from a uniform linear polarizer and a spatially varying achromatic halfwave plate (AHWP). Accordingly, the stationary polarizer 650 is for transmitting an m=2 vortex of linear polarized light or for converting uniform linearly polarized light into an m=2 vortex of linear polarized light. In each case, the m=2 vortex of linear polarized light is any m=2 polarization vortex (i.e. polarization orientation as a function of azimuthal position=$\theta_p$=(m/2)$\phi$+$\delta$, where $\phi$ is the azimuthal position about the center point relative to an arbitrary reference azimuth, and m is the vortex order, and $\delta$ is an offset angle relative to the arbitrary reference azimuth). Notably, the fast axis orientation of the actuated retarder and the location of the illumination spot should be chosen accordingly in order to preserve the optimal difference between the fast axis and the incident polarization.

The actuated optical retarder 660 selectively provides a retardance to the light transmitted from the stationary polarizer 650. Referring to FIG. 6c, the optical retarder 660 has a plurality of segments, including a first segment 661 for ensuring the horizontally polarized light transmitted from the stationary polarizer 650 has a first polarization (i.e., left circular) and a second segment 662 for ensuring that the horizontally polarized light transmitted from the stationary polarizer 650 has a second other polarization (i.e., right circular). Each segment has a substantially uniform retardance value. In this embodiment each segment provides quarter-wave retardance. The two segments 661, 662 are separated by a boundary along which there is a 90 degree offset in the azimuthal angle of the fast axis. At this boundary 667, the transmitted polarization switches between two orthogonal states, which in this case are RH and LH states.

Referring again to FIG. 6c, the fast axis (illustrated with arrows) of the actuated optical retarder 660 is spatially varied within each segment 661, 662. More specifically, the azimuthal angle of the fast axis varies within each segment, while the polar angle is constant (e.g., the polar angle is typically selected such that the optical retarder is configured as an A-plate or an O-plate). In general, the azimuthal angle of the spatially varying fast axis in each sector is substantially constant in a radial direction and changes tangentially. If the optical retarder is fabricated from a single layer of birefringent material the fast axis will be the spatially varying fast axis of the birefringent material. If the optical retarder is an achromatic retarder (e.g., a multi-layer design wherein two or more retarders are stacked or laminated in order to make the optical retarder achromatic) then the fast axis is an effective fast axis. The in-plane retardance of the optical retarder 660 is determined by the birefringence of the material, the polar angle, and the thickness of the birefringent layer(s).

The spatially varied fast axis within each segment 661, 662 is predetermined to provide a constant fast axis orientation at the illumination spot 668 as the retarder 660 is rotated about the rotation axis 480. Accordingly, the fast axis orientation within the illumination spot is substantially constant relative to itself over time and the area of incidence. In particular, since the stationary polarizer 650 preconditions the light incident on the actuated retarder 660, the polarization provided by the actuated optical retarder 660 will be relatively constant over the cross section of the exit beam. As a result, the illumination field may be substantially larger than the illumination field in the above-described embodiments.

In contrast, the fast axis orientation between segments, for a given illumination field, will differ by 90 degrees. As discussed above, while the azimuthal angle of the fast axis is spatially varied across the surface of the optical retarder 660, the polar angle and thickness of the birefringent layer is selected to provide quarter-wave retardance (or an odd multiple of quarter-wave retardance). As is well known in the art, a quarter-wave plate produces a $\lambda/4$ phase shift and can change linearly polarized light to circular polarized light when the fast axis of the quarter-wave plate is at a 45 degree angle to the polarization of the incident light. Accordingly, if the fast axis of the half-wave retarder is at 45 degrees to the polarization plane, the light transmitted from the polarizer 650 will be converted to left or right circularly polarized light. Since the fast axis orientation between segments, for a given illumination field, differs by 90 degrees, rotation of the optical retarder 660 will alternately produce left and right-circularly polarized light.

In one embodiment, the spatially varying fast axis is achieved by forming each segment 661, 662 using an optical vortex retarder, or part of an optical vortex retarder. For example, in one embodiment each of the first 661 and second 662 segments is a segment of a m=2 vortex retarder fabricated such that the vortex is offset by 90 degrees between segments. The optical vortex retarder 660 is mounted such that the azimuthal angle of the fast axis (or effective fast axis) of each segment of the vortex retarder rotates about a point coincident with the center of mechanical rotation (i.e., about rotation axis 180). Accordingly, the fast axis or effective fast axis angle will vary in a gradual and continuous manner about the point according to a linear relationship with azimuthal position (i.e. fast axis angle=θ☐=(m/2)φ+δ, where φ is the azimuthal position about the center point relative to an arbitrary reference azimuth, and m is the vortex order, and δ is an offset angle relative to the arbitrary reference azimuth). In addition, the optical retarder 660 is mounted such that the light transmitted from the projector is incident on a region of the optical retarder where the fast axis or effective fast axis of the retarder in the optical path is substantially +/−45 degrees orientation relative to the orientation of the incident linear polarization. Accordingly, when the segmented vortex retarder is rotated by the actuator about the rotation axis, it alternately provides right and left circularly polarized light. More specifically, the actuator rotates the segmented vortex retarder such that the incident polarized light (e.g., first having passed through a linear polarizer 450 and/or an optional aperture) sees a substantially constant effective fast axis azimuthal orientation in each segment that is +/−45 degrees relative to the orientation of the incident linear polarization, as the segmented retarder is rotated in the optical path.

In operation, the single projector 110 is used to project stereoscopic images. For example, if the stereoscopic images correspond to digital data then, in one embodiment, the projector alternately projects left- and right-eye frames. The left- and right-eye frames are transmitted to the stationary polarizer 650, where they form an optical vortex. As the actuator 665 rotates the optical retarder 660 in synchronized timing with the emission of the left- and right-eye frames, the left- and right-eye images will be projected with alternating right-handed/left-handed circular polarizations onto the projection screen 120. The viewer 140 having glasses 130 views the left- and right-eye frames reflected from the screen 120. More specifically, the right-eye covered by a first circular analyzer will see only the right-eye images having a first polarization (e.g., RH), whereas the left-eye covered by a second circular analyzer will see only left-eye images having a second polarization (e.g., LH). Although not ideal, it is acceptable for some crosstalk to occur. For example, each eye can receive some of the light intended for the other eye. The net result is that the left eye receives substantially one viewpoint and the right eye receives substantially the other viewpoint. Upon processing the two viewpoints, the viewer 140 perceives a three-dimensional image of the scene.

In each of the above described embodiments, the segmented optical retarder 160, 260, 460, and 660 can be made by assembly of segments (i.e. bonding) or made as a monolithic component. In either case, an opaque mask is optionally applied at the interface of segments in order to cover any imperfections. One method of fabricating the segmented retarder as a monolithic component is to form one or more layers of optical retarders using a photo-aligned liquid crystal polymer (LCP). Advantageously, using LCP technology means that the transition between segments will not result in significant diffraction. Optionally, an opaque mask is applied at the interface of segments in order to cover any imperfections. Notably, monolithic optical retarders are expected to display increased optical and/or mechanical durability in the high temperature and light flux environment of the projection system relative to an optical retarder made of the same material wherein the left and right segments are bonded.

In one embodiment, a LCP-based multi-segment optical retarder with an m=2 vortex alignment of azimuthal angle of the fast axis within each segment is fabricated by spin coating a photoalignment layer onto a substrate (e.g., a glass substrate having an antireflection coating coated on the back surface), exposing the alignment layer to linearly polarized ultraviolet (UV) light through an aperture while rotating the substrate about a center of rotation so as to expose the photoalignment layer to the polarized UV light in an azimuthal-scanning manner, and where at the intended segment boundaries of the multi-segment retarder the orientation of the polarized UV light is changed in a step function (for example by 45 degree or 90 degrees). Subsequently a liquid crystal polymer precursor is coated on the alignment layer, and cured to form the LCP-based multi-segment optical retarder on the substrate. Subsequently the mutli-segment optical retarder is optionally coated with an antireflection coating, or an optional coverglass having an antireflection coating is laminated to the LCP layer.

The design and fabrication of achromatic spatially-varying retarders is further discussed in US Pat. Appl. Nos. 20080226844 and 20090122402, and in Scott C. McEldowney et al, "Creating vortex retarders using photoaligned liquid crystal polymers" Optics letters, vol. 33, no. 2, page 134, 2008, both of which are incorporated herein by reference.

In general, the following equations describe the necessary effective fast axis (FA) alignment for the achromatic quarter-wave plate (AQWP) wheel, where angles are in units of degrees).

$FA(\theta)=\theta+d_1$, for $0<\theta<180$deg  (i.e. segment #1)

$FA(\theta)=\theta-d_2$, for $-180<\theta<0$deg  (i.e. segment #2)

where θ is the azimuthal angle about a center of rotation on the part, measured relative to some reference azimuth on the wheel 460, and where $|d_1-d_2|=90$ degrees.

Notably, the achromatic spatially-varying polarizer 650 can also be fabricated using these methods (e.g., when the achromatic spatially varying polarizer 650 includes a uniform linear polarizer and a spatially varying achromatic halfwave plate (AHWP)). Achromatic spatially-varying polarizers are also discussed in US Pat. Appl. No. 20090122402.

In the embodiments described above with reference to FIGS. 2a, 4a, and 6a, the mechanically actuated optical retarder 260, 460 is shown to include a segmented retarder wheel, wherein each segment has a vortex orientation of its fast-axis. In other embodiments, the actuated optical retarder provides a constant fast axis or effective fast axis orientation at the illumination spot 768 by providing segments having a constant fast axis orientation, and wherein the optical retarder is translated to switch between different segments.

Figure 7A:
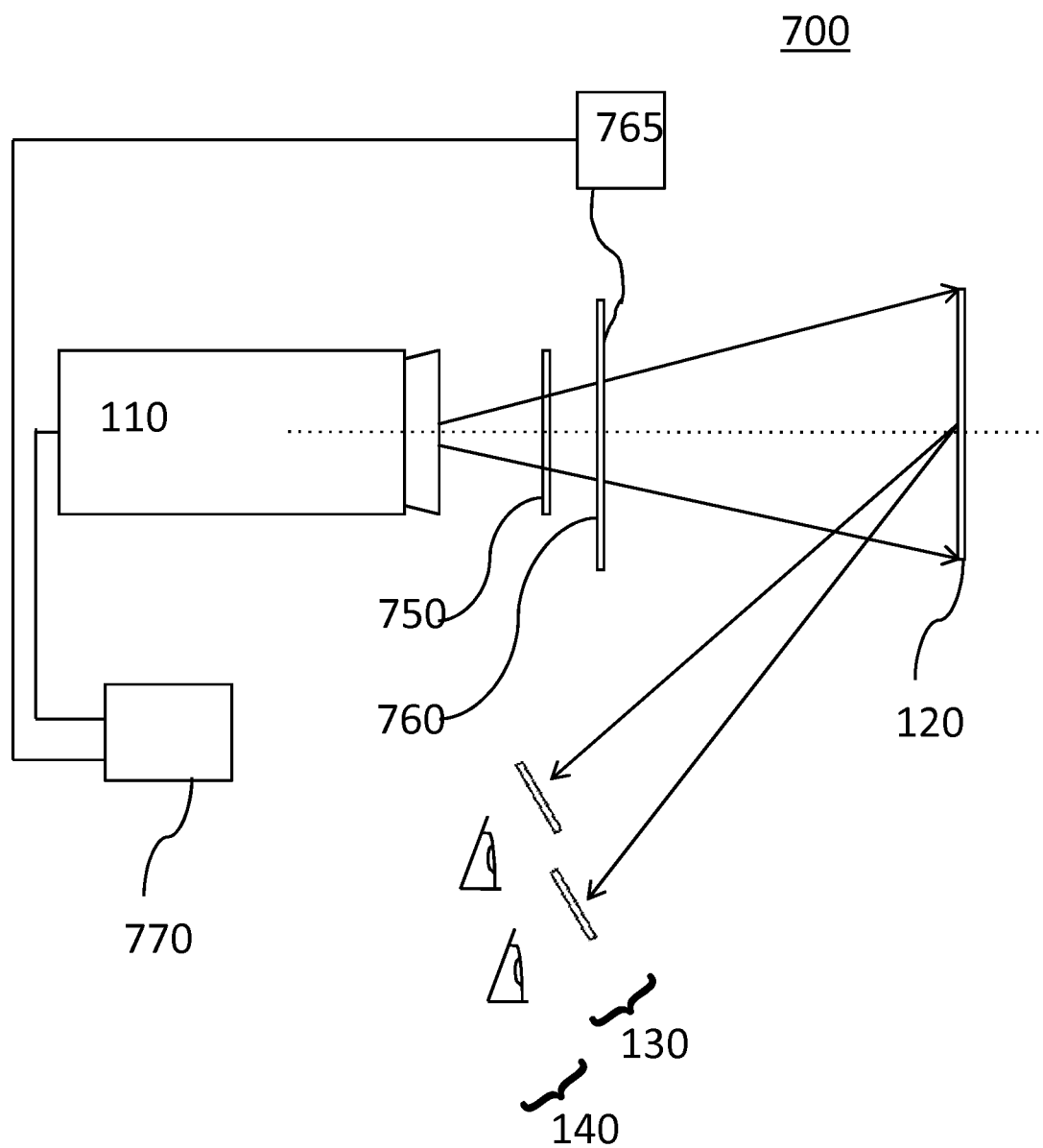
FIG. 7a is a schematic diagram showing a side view of a projection system in accordance with another embodiment of the instant invention wherein the right-eye and left-eye images are projected using circularly polarized light.

Referring to FIG. 7a, there is shown a projection system in accordance with another embodiment of the instant invention. The projection system 700 includes an image projector 110, a projection screen 120, and eyewear 130, which is typically worn by a viewer 140, as described in the embodiment illustrated in FIG. 1. The projection system 700 also includes a stationary polarizer 750, a mechanically actuated optical retarder 760, and a controller 770.

The stationary polarizer 750 preconditions the polarization state at all points of the illumination field of light incident thereon. More specifically, the stationary polarizer 750 preconditions the light such that the linear polarization orientation will be optimal at all points as it encounters the actuated optical retarder 760. In one embodiment, the stationary polarizer 750 is a linear polarizer having a uniform fast axis orientation, such as a wire grid polarizer or dichroic sheet polarizer, oriented to ensure that all light projected from the projector 110 has the same polarization (e.g., horizontal).

Figure 7B:
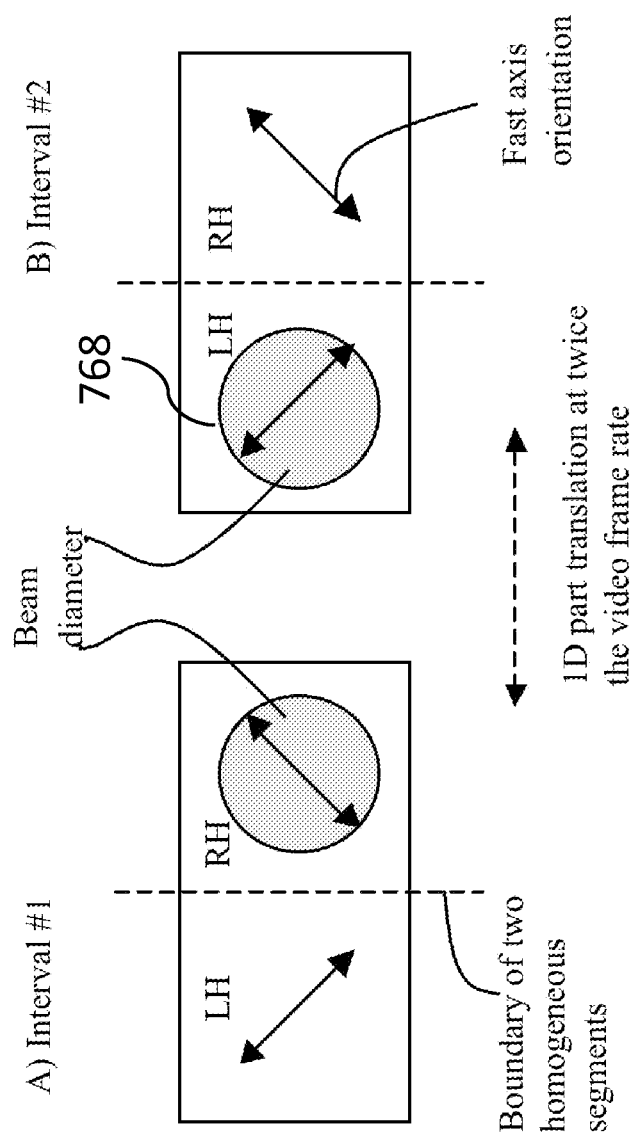

The actuated optical retarder 760 selectively provides a retardance to the light transmitted from the stationary polarizer 750. Referring to FIG. 7b, the optical retarder 760 has a plurality of segments, including a first segment (LH) for ensuring the horizontally polarized light transmitted from the stationary polarizer 750 and through it has a first polarization (i.e., left-handed circular) and a second segment (RH) for ensuring that the horizontally polarized light transmitted from the stationary polarizer 750 and through it has a second other polarization (i.e., right-handed circular). In other words, the actuated optical retarder 760 is patterned such that the two halves of the optical component present orthogonal fast axis orientations to the input beam. In this embodiment, segment has a substantially uniform retardance corresponding to quarter-wave retardance or an odd multiple of quarter-wave retardance (i.e., is a quarter-wave plate (QWP)). Accordingly, the optical retarder 760 is QWP (or an achromatic QWP) patterned with alternate ±45 degree uniform fast axis orientations in the right and left halves, respectively. The two segments LH, RH are separated by a plane along which there is a 90 degree offset in the azimuthal angle of the fast axis, which defines the boundary between the two homogeneous segments. At this boundary, the transmitted polarization switches between two orthogonal states, which in this case are RH and LH states.

Referring again to FIG. 7b, the fast axis (illustrated with arrows) of the actuated optical retarder 760 is constant (i.e., non-varied) within each segment. More specifically, the azimuthal angle and the polar angle of the fast axis are constant within each segment. If the optical retarder is fabricated from a single layer of birefringent material the fast axis will be the fast axis of the birefringent material. If the optical retarder is an achromatic retarder (e.g., a multi-layer design wherein two or more retarders are stacked or laminated in order to make the optical retarder achromatic) then the fast axis is an effective fast axis. The in-plane retardance of the optical retarder 760 is determined by the birefringence of the material, the polar angle, and the thickness of the birefringent layer(s).

The fast axis within each segment LH, RH is predetermined to provide a constant fast axis orientation at the illumination spot 768 as the retarder 760 is translated between a first position where the beam of light is incident on the LH segment and a second position where the beam of light is incident on the RH segment. Accordingly, the fast axis orientation within the illumination spot is substantially constant relative to itself over time and the area of incidence, for each segment.

In operation, the single projector 110 is used to project stereoscopic images. For example, if the stereoscopic images correspond to digital data then, in one embodiment, the projector alternately projects left- and right-eye frames. The left- and right-eye frames are transmitted to the stationary polarizer 750, where they horizontally polarized. As the actuator 765 translates the optical retarder 760 in synchronized timing with the emission of the left- and right-eye frames, the left- and right-eye images will be projected with alternating right-handed/left-handed circular polarizations onto the projection screen 120. The viewer 140 having glasses 130 views the left- and right-eye frames reflected from the screen 120. More specifically, the right-eye covered by a first circular analyzer will see only the right-eye images having a first polarization (e.g., RH), whereas the left-eye covered by a second circular analyzer will see only left-eye images having a second polarization (e.g., LH). Although not ideal, it is acceptable for some crosstalk to occur. For example, each eye can receive some of the light intended for the other eye. The net result is that the left eye receives substantially one viewpoint and the right eye receives substantially the other viewpoint. Upon processing the two viewpoints, the viewer 140 perceives a three-dimensional image of the scene.

In one embodiment the optical retarder 760 is a monolithic dual-zone patterned orientation QWP or AQWP, which advantageously is able to withstand the high temperature associated with digital cinema projectors. In other embodiments, the optical retarder is formed by adhering two discrete components together to form a two-zone variable axis QWP. In yet, another embodiment, two stand alone QWPs with perpendicular axis orientations are alternately translated in and out of the beam of light. In each of these embodiments, the optical retarder 760 may be formed using LCP technology.

Advantageously, the optical retarder 760 discussed with regard to FIG. 7 is significantly smaller than the rotated optical retarders 260, 460, and 760, discussed above. For example, the required size for a spinning wheel is at least four times the intended illumination area, whereas the translated two-zone plate only needs to be approximately twice the size of the intended illumination area. In addition, the uniform fast axis within each zone provides improved efficiency.

Figure 8:
FIG. 8 is a schematic diagram of a front view of another embodiment of an actuated quarter-wave optical retarder used.

Referring to FIG. 8, there is shown yet another embodiment of actuated optical retarder. The optical retarder is a periodically patterned AQWP having two interlaced orientations in a regular pattern in a direction of translation/oscillation. Each zone has the same length in the direction of translation. In this embodiment, the AQWP has a striped pattern. In other embodiments, the AWQP has a checkerboard pattern. In each case, the actuator translates/oscillates the optical retarder back and forth by a distance equal to the length of the zone in the direction of translation. Advantageously, this embodiment allows for smaller displacements and for a smaller overall component size. In general, this embodiment may require formatting so that appropriately spatially interlaced pieces of the left and right eye images are presented in each image frame.

In each of the above-described embodiments, the segments of the actuated optical retarder are described as providing alternating polarizations (e.g., LH/RH, V/H) only. In other embodiments, wavelength selective filters are incorporated into the segments. For example, in one embodiment, 3-wavelength band selective filters are incorporated in the wheel sectors, such that only certain R+G+B wavelength bands (collectively called "band #1") are transmitted by some sectors, and such that only different R+G+B wavelength bands (collectively called "band #2") are transmitted by other sectors. By appropriate combination of these wavelength filters with the waveplate elements, a rotating wheel can be made that produces in sequence up to 2*N different output beam types, where N=number of wavelength selective filters. For example, one embodiment of the 2N different output beam types is illustrated in Table 1.

TABLE 1

Sequence of up to 2N different output beam types.

| Number | Band | Circular polarization |
|---|---|---|
| 1 | Band#1 | Right-circular polarized |
| 2 | Band#1 | Left-circular polarized |
| 3 | Band#2 | Right-circular polarized |
| 4 | Band#2 | Left-circular polarized |
| . | | |
| . | | |
| . | | |
| 2N − 1 | Band#N | Right-circular polarized |
| 2N | Band#N | Left-circular polarized |

A projection system employing this scheme could be used to simultaneously time-sequentially project up to 2N/2 different 3-dimensional scenes to 2N/2 independent viewers (i.e. each viewer viewing a different 3-dimensional scene). Also, this approach could be used to simultaneously time-sequentially project up to 2N different 2-dimensional scenes to 2N independent viewers (i.e. each viewer viewing a different 2-dimensional scene). The image that each observer receives in their left eye and right eye depends on the specific lens placed in front of each eye. In total there would be 2N different types of lenses required. Each lens would contain either a left-circular or right-circular polarization analyzer, plus one of N types of wavelength selective filters. Notably, this approach could be applied to other methods of producing time sequential right-/left-circular polarized images (e.g., JP2001174750A2 and WO08056929A1). A useful application of this embodiment pertains to the simultaneous presentation of multiple movies in a movie theater. For example, after a period of peak attendance for a film in a dedicated or prime theatre space has subsided, yet while there still exists a small to moderate market, a cinemaplex operator can elect to move its showing into another theatre where the film could be shown simultaneously along with other after-peak-market films, and thereby maximizing utilization (viewer occupation) of theatre space. In this case, each viewer would be provided with the appropriate pair of glasses and headphones corresponding to the film that they wish to view.

Advantageously, each of the above-described embodiments provides a unique method of creating polarization-based (R/L or H/V) 3D image presentation with the use of a single projector. In addition, the stationary polarizer/actuated optical retarder can be used with both LCOS technology and DLP (e.g., with polarization clean up) to provide a cost effective approach to retrofitting existing projection systems.

Further advantageously, the above-described embodiments provide high efficiency conversion of linearly polarized light to two different alternating orthogonal polarizations (e.g., since the light sees/experiences a substantially constant effective fast axis azimuthal orientation within each segment) without the use of shutters and/or active LCDs.

Of course, the above embodiments have been provided as examples only. It will be appreciated by those of ordinary skill in the art that various modifications, alternate configurations, and/or equivalents will be employed without departing from the spirit and scope of the invention. For example, in each of the above-described embodiments the stationary polarizer and actuated optical retarder are shown being separate from the projector for illustrative purposes only. In general, the stationary polarizer and/or the actuated optical retarder may be part of the projector 110, or may be separate from the projector 110. In each case, the stationary polarizer and actuated optical retarder will receive light transmitted from the imager (e.g., which may be via the projection lens). In addition, while the embodiment illustrated in 7a discuss projecting the left- and right-eye images using circularly polarized light, similar embodiments using linearly polarized light are envisaged. Accordingly, the scope of the invention is therefore intended to be limited solely by the scope of the appended claims.

The invention claimed is:

1. A projection system comprising:
an imager for sequentially emitting left-eye and right-eye images;
an optical retarder having a plurality of segments including a first segment and a second segment, the first segment for converting left-eye images to a first polarization, the second segment for converting right-eye images to a second other polarization; and
an actuator for one of rotating and translating the optical retarder according to timing synchronization of the left-eye and right-eye image emissions such that a polarized beam of light incident on the first segment samples a first fast axis orientation that is substantially constant relative to itself over time as the optical retarder is one of rotated and translated, and such that the polarized beam of light incident on the second segment samples a second other fast axis orientation that is substantially constant relative to itself over time as the optical retarder is one of rotated and translated.

2. A projection system according to claim 1, wherein each of the first and second segments has a spatially varying fast axis orientation.

3. A projection system according to claim 2, wherein the actuator is for rotating the optical retarder, and wherein each of the first and second segments includes at least part of a vortex retarder.

4. A projection system according to claim 2, wherein the optical retarder is an optical wheel retarder, the optical wheel retarder including a transparent disc having a center, the spatially varying fast axis orientation in the each of the first and second segments varying with azimuthal angle about the center of the disc when the optical wheel retarder is not moving.

5. A projection system according to claim 4, wherein the plurality of segments includes a same number of segments providing the first polarization as the second other polarization.

6. A projection system according to claim 1, wherein the first fast axis orientation is orthogonal or at 45 degrees to the second other fast axis orientation.

7. A projection system according to claim 1, wherein the optical retarder is at least one of a quarter-wave plate and an achromatic quarter-wave plate, and wherein the first polarization is left circular polarization and the second polarization is right-circular polarization.

8. A projection system according to claim 1, wherein the optical retarder is at least one of a half-wave plate and an achromatic quarter-wave plate, and wherein the first polarization is a linear polarization and the second polarization is a second other linear polarization orthogonal to the first polarization.

9. A projection system according to claim 1, comprising a stationary linear polarizer disposed between the imager and the optical retarder.

10. A projection system according to claim 2, comprising a stationary spatially varying polarizer disposed between the imager and the optical retarder.

11. A projection system according to claim 10, wherein the stationary spatially varying polarizer includes at least part of an m=2 vortex polarizer.

12. A projection system according to claim 10, wherein the stationary spatially varying polarizer comprises a uniform linear polarizer and a vortex half-wave plate retarder in series.

13. A projection system according to claim 1, wherein the optical retarder is disposed between the imager and a projection lens.

14. A projection system according to claim 4, wherein each of the first and second segments includes a layer of liquid crystal polymer providing one of quarter-wave and half-wave retardance.

15. A projection system according to claim 4, wherein the spatially varying fast axis orientation changes by one of 45 and 90 degrees at a boundary between the first and second segments.

16. A projection system according to claim 4, wherein an azimuthal angle of the spatially varying fast axis in each of the first and second segments is substantially constant in a radial direction and changes in an azimuthal angular direction.

17. A projection system according to claim 16, wherein the azimuthal angular direction is one of clockwise and counterclockwise and wherein the actuator is for rotating the optical retarder in the azimuthal angular direction.

18. A projection system according to claim 4, wherein each of the first and second segments includes a wavelength selective filter.

19. A projection system according to claim 4, wherein each of the first and second segments includes a different wavelength selective filter for transmitting a different portion of each of red, green, and blue wavelength bands.

20. An optical wheel retarder comprising:
a transparent disc having a center and a plurality of sectors, the plurality of sectors including a first sector and a second sector, the first sector including a first waveplate having a predetermined retardance magnitude, the second sector including a second waveplate having the predetermined retardance magnitude, each of the first and second waveplates having a fast axis orientation that varies with azimuthal angle about the center of the disc, wherein the predetermined retardance magnitude provides one of quarter-wave and half-wave retardance within a predetermined wavelength range.

21. An optical retarder according to claim 20, wherein the orientation of the fast axis changes by one of 45 and 90 degrees at a boundary between the first and second sectors.

22. A projection system comprising:
an imager for sequentially emitting left-eye and right-eye images;
an optical retarder having a plurality of segments, the plurality of segments including a first segment and a second segment, the first and second segments having a substantially same and uniform retardance magnitude, each of the first and second segments having a spatially varying fast axis orientation, the first segment including a first region having a first fast axis azimuth orientation relative to an incident polarization state at a first instant when the first region is in an optical path, the second segment including a second region having a second fast axis azimuth orientation relative to an incident polarization state at a second instant when the second region is in the optical path; and
an actuator for rotating the optical retarder according to timing synchronization of left-eye and right-eye image emissions,
wherein the first fast axis azimuth orientation is one of 90 degrees and 45 degrees relative to the second fast axis azimuth relative orientation.

* * * * *